(12) United States Patent
Paul et al.

(10) Patent No.: US 11,054,798 B2
(45) Date of Patent: Jul. 6, 2021

(54) OPERATION PLANNING SYSTEM, METHOD AND DEVICE FOR GENERATING AN OPERATION PLAN USING MULTIPLE PLANNING DEVICES

(71) Applicant: KABUSHIKI KAISHA TOSHIBA, Minato-ku (JP)

(72) Inventors: Topon Paul, Kawasaki (JP); Shuichiro Imahara, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 174 days.

(21) Appl. No.: 16/296,683

(22) Filed: Mar. 8, 2019

(65) Prior Publication Data
US 2019/0369579 A1    Dec. 5, 2019

(30) Foreign Application Priority Data
Jun. 4, 2018    (JP) .............................. JP2018-107224

(51) Int. Cl.
*G05B 19/042*    (2006.01)
*G06N 20/00*    (2019.01)

(52) U.S. Cl.
CPC ........... *G05B 19/042* (2013.01); *G06N 20/00* (2019.01); *G05B 2219/2639* (2013.01)

(58) Field of Classification Search
None
See application file for complete search history.

(56) References Cited

U.S. PATENT DOCUMENTS 10,599,471 B1 *   3/2020  Hilton .................... G06F 9/5083
2011/0071693 A1 *  3/2011  Sun ......................... G06F 16/25
                                                             700/291
(Continued)

FOREIGN PATENT DOCUMENTS

JP      2009-159808        7/2009
JP      2010-035322        2/2010
(Continued)

OTHER PUBLICATIONS

Rabelo et al. 'Multi-agent-based agile scheduling' Robotics and Autonomous Systems 27 (1999) 15-28, which teaches a multi-agent based agile scheduling system.*

(Continued)

*Primary Examiner* — Bernard G Lindsay
(74) *Attorney, Agent, or Firm* — Oblon, McClelland, Maier & Neustadt, L.L.P.

(57) ABSTRACT

According to one embodiment, an operation planning system includes a storage and a plurality of planning devices. The storage is configured to: store information of operating devices and planning devices included in the operation planning system; store a total output required for a plurality of operating devices in a planning period of an operation plan; and store the operation plan including a combination of operating devices operating in the planning period and an output setting value for each of the operating devices in the combination. The plurality of planning devices is configured to: generate the combination satisfying the total output required in the planning period; determine the output setting value for each of the operating devices belonging to the combination; obtain combination data which is data of the combinations generated by the other planning devices; and generate the operation plan based on the combination data.

20 Claims, 24 Drawing Sheets

(56) References Cited

U.S. PATENT DOCUMENTS

| | | | | |
|---|---|---|---|---|
| 2013/0066455 A1* | 3/2013 | Li | ............... | G06Q 10/087 700/100 |
| 2014/0303798 A1* | 10/2014 | Saliba | ............... | G06Q 10/00 700/291 |
| 2015/0318698 A1* | 11/2015 | Tani | ............... | H02J 3/46 700/287 |
| 2018/0181153 A1* | 6/2018 | Takahashi | ............... | G05F 1/66 |

FOREIGN PATENT DOCUMENTS

| | | |
|---|---|---|
| JP | 2010-226865 | 10/2010 |
| JP | 4896084 | 3/2012 |
| JP | 2016-063609 | 4/2016 |
| JP | 2017-011968 | 1/2017 |
| JP | 2017-084346 | 5/2017 |

OTHER PUBLICATIONS

Kawamura et al. 'Development of a Distributed Cooperative Scheduling System Based on Negotiations between Scheduling Agents' Systems and Computers in Japan, vol. 31, No. 1, 2000, which teaches a distributed cooperative scheduling system with multiple schedulers.*

Ademovic et al. 'A Genetic Algorithm Solution to the Unit Commitment Problem Based on Real-Coded Chromosomes and Fuzzy Optimization' Melecon 2010-2010 15th IEEE Mediterranean Electrotechnical Conference, IEEE (2010), which teaches a genetic algorithm system for scheduling power generating units.*

Logenthiran et al. 'Multi-agent system for energy resource scheduling of integrated microgrids in a distributed system' Electric Power Systems Research 81 (2011) 138-148, which teaches a multi-agent system for scheduling microgrids in a power distribution network.*

A. Ademovic, et al., "A Genetic Algorithm solution to the Unit Commitment problem based on real-coded chromosomes and Fuzzy Optimization", Melecon 2010-2010 15th IEEE Mediterranean Electrotechnical Conference, Valletta, 2010, doi:10.1109/MELCON. 2010.5476238, URL:http://ieeexplore.ieee.org/stamp/stamp.jsp?tp=&arnumber=5476238&isnumber=5475895, 6 pages.

* cited by examiner

| PLANNING PERIOD | #1 | #2 | #3 | #4 | #5 | #6 | #7 | #8 | #9 | #10 | #11 | #12 |
|---|---|---|---|---|---|---|---|---|---|---|---|---|
| REQUIRED OUTPUT | 901 | 963 | 1063 | 1209 | 1301 | 1401 | 1471 | 1494 | 1532 | 1532 | 1517 | 1494 |

| PLANNING PERIOD | #13 | #14 | #15 | #16 | #17 | #18 | #19 | #20 | #21 | #22 | #23 | #24 |
|---|---|---|---|---|---|---|---|---|---|---|---|---|
| REQUIRED OUTPUT | 1471 | 1409 | 1440 | 1409 | 1301 | 1163 | 1093 | 1009 | 970 | 932 | 963 | 878 |

EXAMPLE OF DATA STORED IN DEMAND DATABASE

FIG. 3

| DEVICE ID | Min. Power (Pmin) (MW) | Max. Power (Pmax) (MW) | COEFFICIENTS (COST FUNCTION) | | | cold start-up cost (BS) ($/h) | hot start-up cost (TS) ($/h) | Ramp Up Rate (RU) (MW/h) | Ramp Down Rate RD (MW/h) | Min. Operating Time (Ton) (h) | Min. Downtime (Toff) (h) |
|---|---|---|---|---|---|---|---|---|---|---|---|
| | | | a ($/MWh) | b ($/MWh) | c ($/h) | | | | | | |
| A | 80 | 200 | 0.00148 | 1.2136 | 82 | 4250 | 10 | 40 | 40 | 3 | 2 |
| B | 120 | 320 | 0.00289 | 1.2643 | 49 | 5050 | 10 | 64 | 64 | 4 | 2 |
| C | 50 | 150 | 0.00135 | 1.3285 | 100 | 5700 | 10 | 30 | 30 | 3 | 2 |
| D | 250 | 520 | 0.00127 | 1.3954 | 105 | 4700 | 9 | 104 | 104 | 5 | 3 |
| E | 80 | 280 | 0.00261 | 1.35 | 72 | 5650 | 9 | 56 | 56 | 4 | 2 |
| F | 50 | 150 | 0.00212 | 1.54 | 29 | 14100 | 4.5 | 30 | 30 | 3 | 2 |
| G | 30 | 120 | 0.00382 | 1.4 | 32 | 11350 | 5.5 | 24 | 24 | 3 | 2 |
| H | 30 | 110 | 0.00393 | 1.35 | 40 | 4250 | 10 | 22 | 22 | 3 | 2 |
| I | 20 | 80 | 0.00396 | 1.5 | 25 | 5050 | 10 | 16 | 16 | 0 | 0 |
| J | 20 | 60 | 0.0051 | 1.4 | 15 | 5700 | 10 | 12 | 12 | 0 | 0 |

EXAMPLE OF DATA STORED IN DEVICE DATABASE

FIG. 4

1. GENERATE COMBINATION OF OPERATING DEVICES THAT COULD OPERATE IN PLAN (35)

| | A | B | C | D | E | F | G | H | I | J |
|---|---|---|---|---|---|---|---|---|---|---|
| | 0 | 1 | 1 | 1 | 1 | 1 | 1 | 1 | 1 | 0 |

2. DETERMINE START-STOP PATTERNS OF OPERATING DEVICES (COMBINATIONS OF OPERATING DEVICES THAT OPERATE IN EACH PLANNING PERIOD) (45)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| G | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 0 | 0 |
| I | 0 | 0 | 0 | 0 | 0 | 1 | 0 | 0 | 1 | 1 | 1 | 1 | 0 | 1 | 1 | 1 | 1 | 0 | 0 | 0 | 0 | 0 | 0 | 0 |
| H | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 0 | 0 |
| C | 0 | 0 | 0 | 0 | 1 | 1 | 1 | 1 | 1 | 1 | 1 | 1 | 1 | 1 | 1 | 1 | 1 | 1 | 0 | 0 | 0 | 0 | 0 | 0 |
| D | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| E | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

3. DETERMINE OUTPUT SETTING VALUES OF OPERATING DEVICES THAT OPERATE IN EACH PLANNING PERIOD (50)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| G | 0 | 0 | 0 | 0 | 0 | 0 | 120 | 120 | 120 | 120 | 120 | 120 | 120 | 0 | 0 | 0 | 0 | 0 | 0 | 0 | 0 | 0 | 0 | 0 |
| I | 0 | 0 | 0 | 0 | 0 | 80 | 0 | 0 | 80 | 80 | 80 | 80 | 0 | 80 | 80 | 80 | 80 | 0 | 0 | 0 | 0 | 0 | 0 | 0 |
| H | 0 | 0 | 0 | 0 | 110 | 110 | 110 | 110 | 110 | 110 | 110 | 110 | 110 | 110 | 110 | 110 | 0 | 0 | 0 | 0 | 0 | 0 | 0 | 0 |
| C | 0 | 0 | 0 | 150 | 150 | 150 | 150 | 150 | 150 | 150 | 150 | 150 | 150 | 150 | 150 | 150 | 150 | 150 | 0 | 0 | 0 | 0 | 0 | 0 |
| D | 469 | 502 | 520 | 520 | 520 | 520 | 520 | 520 | 520 | 520 | 520 | 520 | 520 | 520 | 520 | 520 | 520 | 520 | 520 | 520 | 505 | 486 | 502 | 457 |
| E | 220 | 235 | 278 | 276 | 266 | 277 | 280 | 314 | 272 | 272 | 275 | 280 | 291 | 269 | 300 | 280 | 266 | 252 | 280 | 250 | 237 | 227 | 235 | 214 |
| B | 212 | 226 | 265 | 263 | 255 | 264 | 291 | 314 | 272 | 272 | 262 | 280 | 291 | 269 | 300 | 280 | 255 | 241 | 293 | 239 | 228 | 219 | 226 | 207 |

OVERVIEW OF OPERATION PLAN GENERATION PROCCESS

FIG. 5

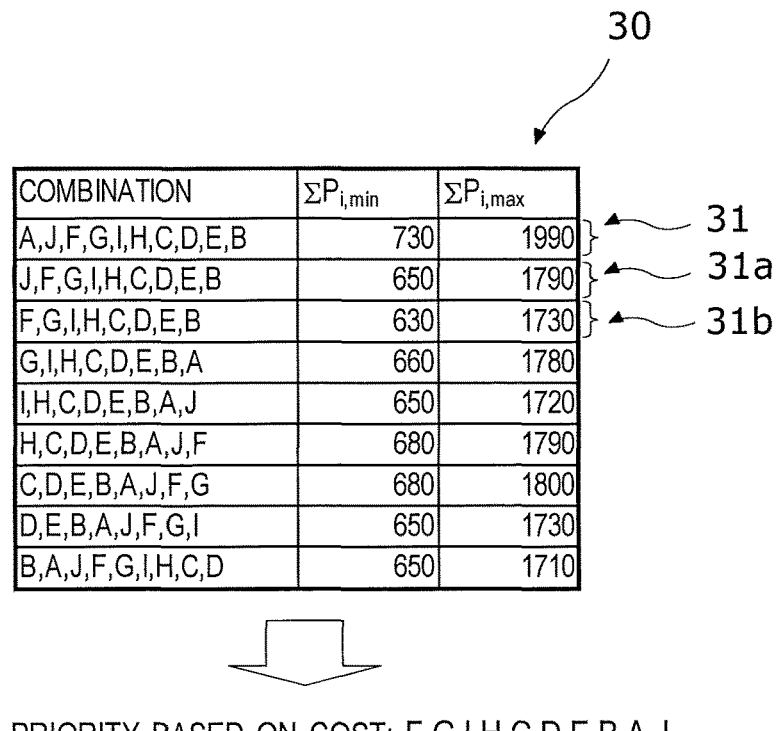
PRIORITY BASED ON COST: F,G,I,H,C,D,E,B,A,J
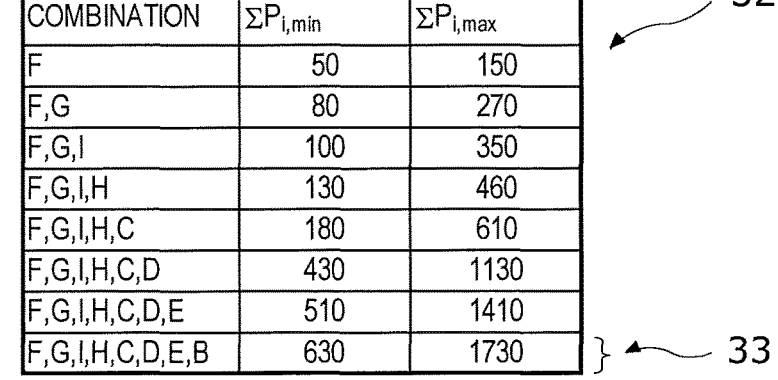
REQUIREMENT: $P_{load, min} = 878MW$  $P_{load, max} = 1532MW$
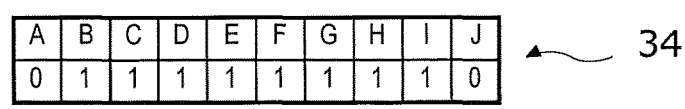
COMBINATION: 510
COMBINATION OF SELECTED OPERATING DEVICES
FIG. 6

COMBINATION:510

THE INITIAL START-STOP PATTERN WHEN COMBINATION OF OPERATING DEVICES OF UNIT_IDS=F,G,I,H,C,D,E,B ARE USED (ALL THE OPERATING DEVICES ARE RUNNING IN THROUGH THE PLANNING PERIODS 1 TO 24)

46

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| F | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| G | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| I | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| H | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| D | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| E | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 7

COMBINATION:510

EXAMPLE OF START-STOP PATTERN GENERATED BY USING COMBINATION OF OPERATING DEVICES OF UNIT_IDS=F,G,I,H,C,D,E,B

41) SEARCH FOR PLANNING PERIODS OPERATING DEVICE F COULD STOP RUNNING

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| F | 1 | 1 | 1 | 1 | 1 | 1 | 1 | 1 | 1 | 1  | 1  | 1  | 1  | 1  | 1  | 1  | 1  | 1  | 1  | 1  | 1  | 1  | 1  | 1  |

42) SINCE OPERATING DEVICE F COULD STOP AT ALL THE PLANNING PERIODS, IT IS CONFIGURED TO STOP AT ALL PLANNING PERIODS. (DELETE FROM COMBINATION)

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| F | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  |

43) SEARCH FOR PLANNING PERIODS OPERATING DEVICE G COULD STOP RUNNING

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| G | 1 | 1 | 1 | 1 | 1 | 1 | 1 | 1 | 1 | 1  | 1  | 1  | 1  | 1  | 1  | 1  | 1  | 1  | 1  | 1  | 1  | 1  | 1  | 1  |

44) SINCE OPERATING DEVICE G COULD STOP AT SOME OF THE PLANNING PERIODS, OPERATING DEVICE G IS CONFIGURED TO STOP AT SOME OF THE PLANNING PERIODS.

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| G | 0 | 0 | 0 | 0 | 0 | 0 | 1 | 1 | 1 | 1  | 1  | 1  | 1  | 0  | 0  | 0  | 0  | 0  | 0  | 0  | 0  | 0  | 0  | 0  |

45) BY REPEATING THE ABOVE PROCESS, THE COMBINATIONS OF OPERATING DEVICES RUNNING IN EACH PLANNING PERIOD ARE DETERMINED.

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|----|----|----|----|----|----|----|----|----|----|----|----|----|----|----|
| G | 0 | 0 | 0 | 0 | 0 | 0 | 1 | 1 | 1 | 1  | 1  | 1  | 1  | 0  | 0  | 0  | 0  | 0  | 0  | 0  | 0  | 0  | 0  | 0  |
| I | 0 | 0 | 0 | 0 | 0 | 1 | 0 | 0 | 1 | 1  | 1  | 0  | 0  | 1  | 1  | 1  | 0  | 0  | 0  | 0  | 0  | 0  | 0  | 0  |
| H | 0 | 0 | 0 | 0 | 1 | 1 | 1 | 1 | 1 | 1  | 1  | 1  | 1  | 1  | 1  | 1  | 0  | 0  | 0  | 0  | 0  | 0  | 0  | 0  |
| C | 0 | 0 | 0 | 1 | 1 | 1 | 1 | 1 | 1 | 1  | 1  | 1  | 1  | 1  | 1  | 1  | 1  | 0  | 0  | 0  | 0  | 0  | 0  | 0  |
| D | 1 | 1 | 1 | 1 | 1 | 1 | 1 | 1 | 1 | 1  | 1  | 1  | 1  | 1  | 1  | 1  | 1  | 1  | 1  | 1  | 1  | 1  | 1  | 1  |
| E | 1 | 1 | 1 | 1 | 1 | 1 | 1 | 1 | 1 | 1  | 1  | 1  | 1  | 1  | 1  | 1  | 1  | 1  | 1  | 1  | 1  | 1  | 1  | 1  |
| B | 1 | 1 | 1 | 1 | 1 | 1 | 1 | 1 | 1 | 1  | 1  | 1  | 1  | 1  | 1  | 1  | 1  | 1  | 1  | 1  | 1  | 1  | 1  | 1  |

FIG. 8

BY HAVING A PLURALITY OF PLANNING DEVICES EXECUTE THE FOLLOWING PROCESS, A PLURATITY OF OPERATION PLANS ARE GENERATED CONCURRENTLY

MINIMUM RATED OUPUT AND MAXIMUM RATED OUTPUT OF OPERATING DEVICES INCLUDED IN THE GENERATED COMBINATION

| COMB. | $\Sigma P_{i,min}$ | $\Sigma P_{i,max}$ |
|---|---|---|
| FGIHCDEB | 630 | 1730 |

⇩ SUPPOSE THAT ALL THE OPERATING DEVICES INCLUDED IN THE GENERATED COMBINATION ARE RUNNING IN ALL THE PLANNING PERIODS

46

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| F | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| G | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| I | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| H | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| C | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| D | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| E | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| B | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

⇩

51

FIRST PLAN

|   | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| F | 108 | 128 | 150 | 150 | 150 | 150 | 150 | 150 | 150 | 150 | 150 | 150 | 150 | 150 | 150 | 150 | 150 | 150 | 150 | 142 | 130 | 118 | 128 | 99 |
| G | 69 | 79 | 98 | 120 | 120 | 120 | 120 | 120 | 120 | 120 | 120 | 120 | 120 | 120 | 120 | 120 | 120 | 113 | 103 | 87 | 81 | 75 | 79 | 64 |
| I | 53 | 64 | 80 | 80 | 80 | 80 | 80 | 80 | 80 | 80 | 80 | 80 | 80 | 80 | 80 | 80 | 80 | 80 | 80 | 71 | 65 | 59 | 64 | 49 |
| H | 71 | 81 | 99 | 110 | 110 | 110 | 110 | 110 | 110 | 110 | 110 | 110 | 110 | 110 | 110 | 110 | 110 | 110 | 110 | 103 | 88 | 82 | 76 | 81 | 66 |
| C | 150 | 150 | 150 | 150 | 150 | 150 | 150 | 150 | 150 | 150 | 150 | 150 | 150 | 150 | 150 | 150 | 150 | 150 | 150 | 150 | 150 | 150 | 150 | 150 |
| D | 250 | 250 | 250 | 309 | 358 | 411 | 448 | 460 | 480 | 480 | 472 | 460 | 448 | 415 | 432 | 415 | 358 | 289 | 261 | 250 | 250 | 250 | 250 | 250 |
| E | 80 | 91 | 116 | 145 | 168 | 192 | 210 | 215 | 225 | 225 | 221 | 215 | 210 | 194 | 202 | 194 | 168 | 135 | 122 | 101 | 92 | 84 | 91 | 80 |
| B | 120 | 120 | 120 | 145 | 165 | 188 | 203 | 209 | 217 | 217 | 214 | 209 | 203 | 190 | 196 | 190 | 165 | 136 | 124 | 120 | 120 | 120 | 120 | 120 |

FIG. 18

THE LEADER PLANNING DEVICE GENERATES
COMBINATIONS OF OPERATING DEVICES

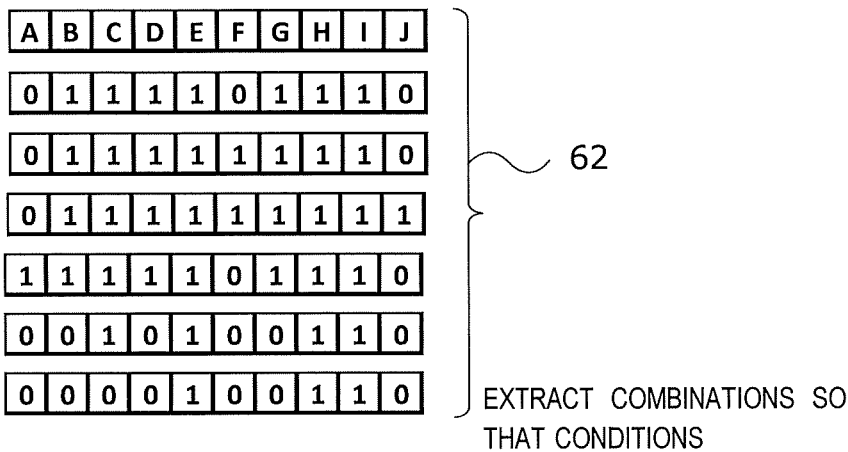

EXTRACT COMBINATIONS SO THAT CONDITIONS $$\sum_i P_{i,\min} \leq P_{load,\min}$$ AND $$P_{load,\max} \leq \sum_i P_{i,\max}$$

ARE SATISFIED

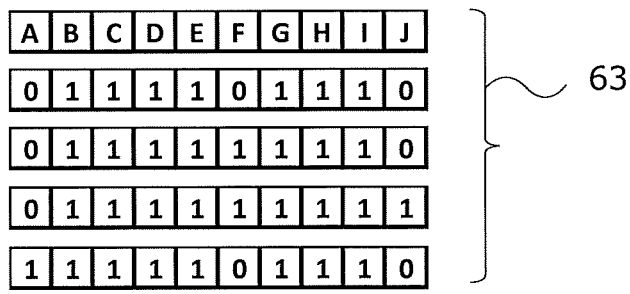

GENERATE START-STOP PATTERNS USING SELECTED COMBINATION OF OPERATING DEVICES. DETERMINE OUTPUT SETTING VALUES FOR EACH PLANNING PERIOD. CALCULATE COSTS AND SCORES.

SAVE DATA OF START-STOP PATTERNS, OUTPUT SETTING VALUES FOR PLANNING PERIODS, COSTS AND SCORES IN SHARED STORAGE SPACE.

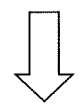

FIG. 21

OPERATION PLANNING SYSTEM, METHOD AND DEVICE FOR GENERATING AN OPERATION PLAN USING MULTIPLE PLANNING DEVICES

CROSS-REFERENCE TO RELATED APPLICATIONS

This application is based upon and claims the benefit of priority from Japanese Patent Application No. 2018-107224, filed on Jun. 4, 2018; the entire contents of which are hereby incorporated by reference.

FIELD

Embodiments described herein relate generally to an operation planning system, an operation planning method and a planning device.

BACKGROUND

To generate an operation plan for a system including a plurality of operating devices, the combination of operating devices running in a specific period and the output setting values for each of the operating devices in the specific period need to be determined. Also, the total output provided by the operation plan needs to satisfy the constraints of the system. If a plurality of operation plans are generated, the most cost-efficient operation plan can be selected. If the scale of system becomes significantly large, the number of possible combinations and the number of possible patterns for workload balancing may become enormous. In such cases, the demand for computing resources would continue to increase.

In electric power systems, the process of generating operation plans and updating operation plans tend to concentrate in a server installed in the load dispatching center. In such systems, it is difficult to generate operation plans within a short time period. Also, when changes in conditions and configurations are detected, a significant delay may occur between the detection of changes and the updating of operation plan. Development of technology which enables efficient generation of operation plans within a shorter time period is needed, considering the scale of the systems.

BRIEF DESCRIPTION OF THE DRAWINGS

FIG. 3 is a diagram presenting an example of data stored in demand database;

FIG. 4 is a diagram presenting an example of data stored in device database;

FIG. 5 is a diagram explaining an overview of the operation plan generation process;

FIG. 6 is a diagram explaining an example of a process generating a combination of operating devices;

FIG. 7 is a diagram presenting an example of a start-stop pattern in the initial stage;

FIG. 8 is a diagram presenting an example of a process determining the operating devices running in each planning period;

FIG. 18 is a diagram presenting an example of data generated in the operation plan generation process according to the fifth embodiment;

FIG. 21 is a diagram presenting an example of data generated in the operation plan generation process according to the sixth embodiment;

DETAILED DESCRIPTION

According to one embodiment, an operation planning system includes a storage and a plurality of planning devices. The storage is configured to: store information of operating devices and planning devices included in the operation planning system; store a total output required for a plurality of operating devices in a planning period of an operation plan; and store the operation plan including a combination of operating devices operating in the planning period and an output setting value for each of the operating devices in the combination. The plurality of planning devices is configured to: generate the combination satisfying the total output required in the planning period; determine the output setting value for each of the operating devices belonging to the combination; obtain combination data which is data of the combinations generated by the other planning devices; and generate the operation plan based on the combination data.

Hereinafter, embodiments of the present invention will be described with reference to the drawings.

First Embodiment

Figure 1:
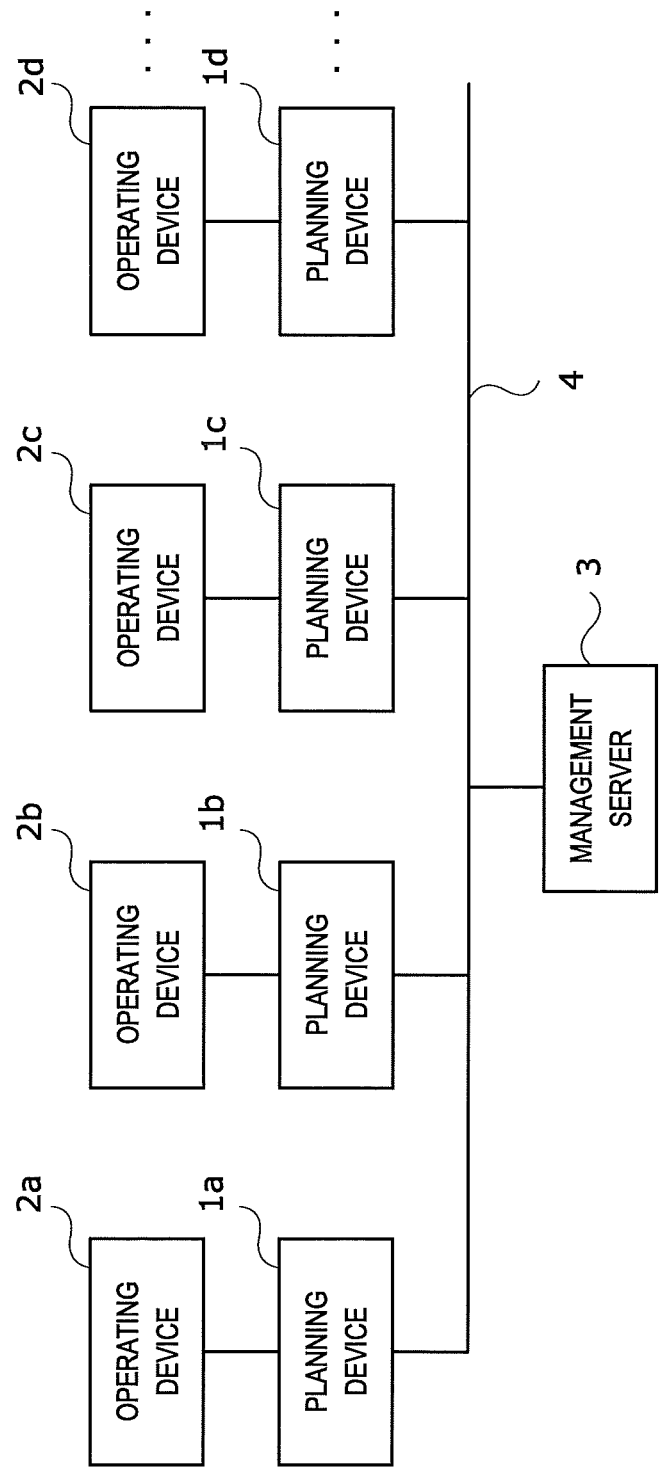
FIG. 1 is a diagram illustrating a configuration example of an operation planning system according to a first embodiment.

FIG. 1 is a diagram illustrating a configuration example of an operation planning system according to a first embodiment. An operation planning system according to a first embodiment will be described with reference to FIG. 1.

The operation planning system in FIG. 1 includes a planning device 1a, a planning device 1b, a planning device 1c, a planning device 1d, an operating device 2a, an operating device 2b, an operating device 2c, an operating device 2d, and a management server 3. The planning devices 1a, 1b, 1c, 1d and the management server 50 can communicate data via a network 4. The network 4 can be a wireless network, wired network with electrical connections or a combination of the above.

Each operating device is combined with at least one planning device. Thus, in the example of FIG. 1, the planning device 1a and the operating device 2a are coupled. Also, the planning device 1b and the operating device 2b, the planning device 1c and the operating device 2c, the planning device 1d and the operating device 2d are coupled, respectively. In the system illustrated in FIG. 1, each of the operating devices is coupled with only one planning device. However, it is possible to combine a plurality of planning devices with a single operating device. In the system of FIG. 1, there are four pairs of planning devices and operating devices. However, the number of pairs in the operation planning system can be greater or smaller.

Planning devices 1a to 1d each share the workload required for generating an operation plan for each operating device. The operation plan includes the combination of operating devices running during a specific period and the output setting values for each of the operating devices running during the specific period. In the following, the specific period is called a planning period. For example, the planning device 1a executes part of the operation plan generation process. After the operation plan is generated, the planning device 1a controls the operating device 2a which is coupled with the planning device 1a. The operation plan generation process can be executed when the operating device is not running. Also, the operation plan generation process can be executed when the operating device is running. Thus, the timing when the operation plan generation process is executed is not limited.

The planning devices 1a to 1d can be information processing devices such as computers including more than 1 CPU (Central Processing Unit), a storage and a communication circuit. The planning devices 1a to 1d can execute an OS (Operating System) and an application. Details of the planning devices are described later.

In the operation planning system according to the embodiment, the workload required for generating the operation plan is balanced across a plurality of planning devices. Since the workload does not concentrate in a certain component or device, the computing resources can be utilized efficiently. Each of the planning devices can obtain information on the combination of operating devices generated by the other planning devices. Then, each of the planning devices generates different operation plans based on the combination of operating devices. Each planning device can use the operation plans generated by other planning devices to generate a different operation plan with lower costs and desired characteristics. Examples of desired characteristics include cost efficiency, reduced environmental load and stability of output. However, the desired characteristics can be other factors.

The network 4 enables communication of data between each of the planning devices. The network 4 also enables communication of data between each planning device and the management server 3. The communication media of the network 4 can be optical fibers, LAN cables, telephone lines, coaxial cables, wireless or the like. An example of communication standard used by the network 4 is Ethernet. However, any other standard can be used.

The management server 3 manages data shared between each planning device. The management server 3 is an information processing device such as a computer including more than one CPU (Central Processing Unit), a storage and a communication device. The management server 3 is capable of running an OS (Operating System) and an application. Each planning device can generate operation plans based on the data stored in the management server. The management server 3 is not limited to servers installed at a specific location or servers with specific configurations. The management server 3 can be physically independent from the planning devices. Also, the management server 3 can be implemented in the same hardware as any of the planning devices.

The management server 3 can be a physical computer, a virtual machine (VM), a container or a combination of these. The features of the management server 3 can be implemented to more than one physical computer, virtual machine or a container. For the sake of higher availability and load balancing, a plurality of management servers 3 can be used. Details of the management server are described later.

The operating devices 2a to 2d are devices or a combination of devices controlled by the coupled planning device. The operating devices 2a to 2d operate according to the operation plan. Examples of operating devices 2a to 2d include power generators of an electric power system. The power generation method of the power generators can be thermal, nuclear, hydroelectric, pumped-storage, solar, wind power, geothermal or any other method. If thermal power or nuclear power is used, the type of fuel is not limited. The operating devices 2a to 2d do not need to be power generators of the same type. Thus, the operating devices 2a to 2d can be a combination of different types of power generators. The power generators can have different sizes, characteristics and ages.

In the following, cases when the power generation plan of the electric power system is generated by using the operation planning system are described as an example. Thus, in the description below, the operating devices 2a to 2d are power generators in the electric power system. However, the operation planning system can generate plans for systems other than the electric power system. Thus, the operating devices 2a to 2d can be other devices or other combination of devices. For example, if a manufacturing plan is generated by the operation planning system, the operating devices 2a to 2d can be production lines, various manufacturing devices, plants and factories. If an operation plan for a swarm robotic system is generated, the operating devices 2a to 2d are robots. If an operation plan for an air conditioning system is generated, the operating devices 2a to 2d are air conditioners.

Figure 2:
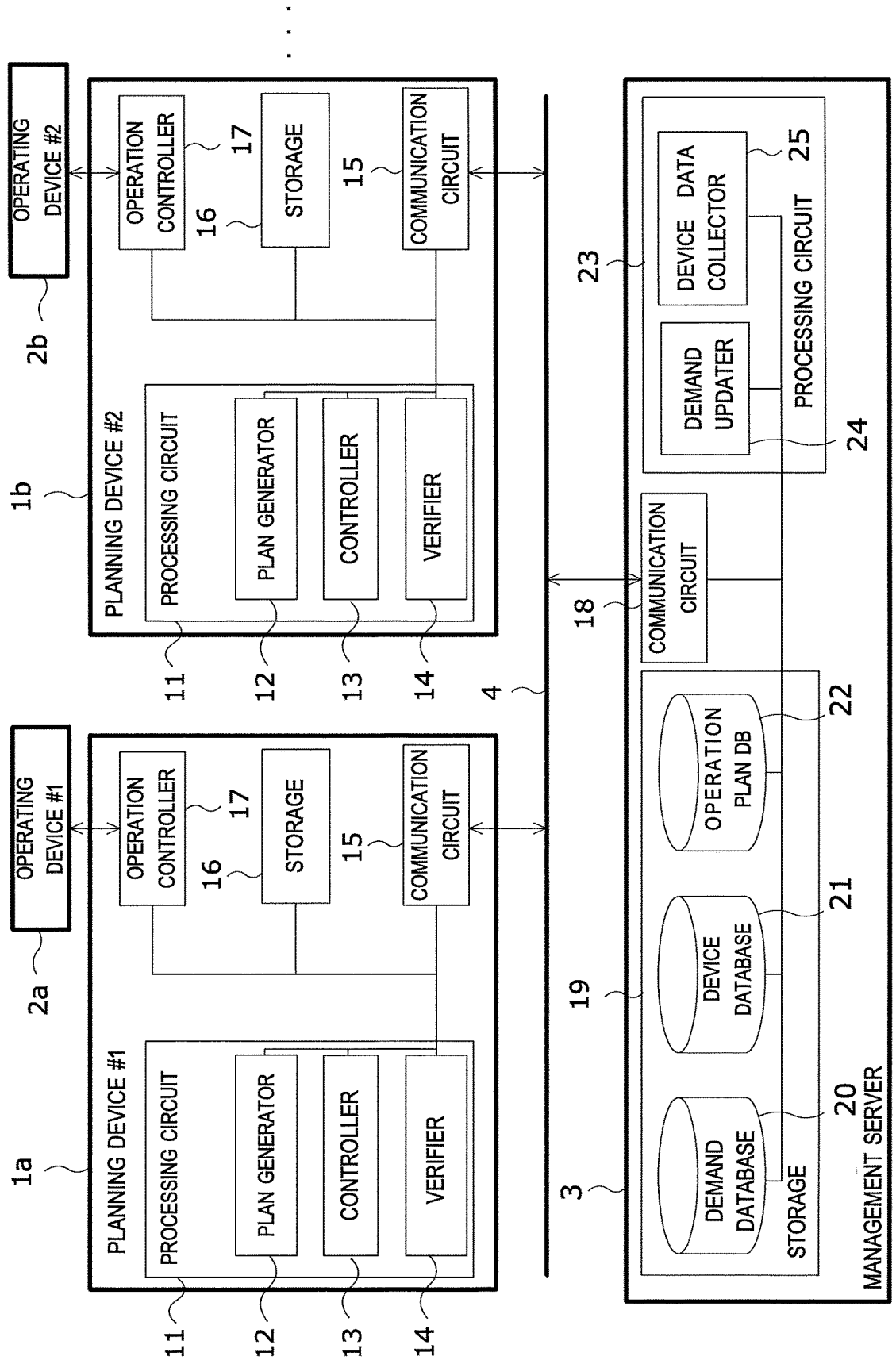
FIG. 2 is a block diagram illustrating a configuration example of the operation planning system according to the first embodiment.

FIG. 2 is a block diagram illustrating a configuration example of the operation planning system according to the first embodiment. In the following, components of the operation planning system are described with reference to FIG. 2.

In FIG. 2, planning device 1a (planning device #1) and operating device 2a (operating device #1) are coupled. Also, planning device 1b (planning device #2) and operating device 2b (operating device #2) are coupled. Although not illustrated in FIG. 2, the operation planning system can include other pairs of planning devices and operating devices. For example, the operation planning system can include a pair including a planning device #3 and an operating device #3.

First, components of the management server 3 are described. The management server 3 includes a communication circuit 18, a storage 19 and a processing circuit 23. A demand database 20, a device database 21 and an operation plan database (operation plan DB) 22 are saved in the storage 19. Also, the processing circuit 23 includes a demand updater 24 and a device data collector 25 as internal components.

The communication circuit 18 enables communication of data between each planning device via the network 4. Examples of the communication circuit 18 include the NIC (Network Interface Card) and wireless communication modules. However, the type of circuit is not limited.

The storage 19 provides storage space for saving data related to the operation plan and data of programs. However, the type of data saved in the storage 19 is not limited. The storage 19 can be volatile memory such as SRAM or DRAM. The storage 19 can also be nonvolatile memory such as NAND, MRAM or FRAM. The storage 19 can be external storage devices or storage devices such as HDD or SSD. Also, the storage 19 can be a combination of the devices mentioned above.

At least part of the storage space in the storage 19 is accessible from the plurality of planning devices. For example, the operation plan database 22 is saved in storage space which is accessible from the plurality of planning devices. Access to the storage space can be executed by using APIs or any other method. Here, access to the storage space includes data reads and data writes.

The processing circuit 23 executes various computations and control processes to enable the feature of the management server 3. The processing circuit 23 can be implemented by hardware circuitry including processors (CPUs), ASIC and CPLD. Also, programs such as applications can operate on the hardware circuitry. A combination of hardware circuitry and programs can be used to implement the processing circuit 23.

The demand database 20 stores the total output required in each planning period. Here, the total output is the total output of the system (for example, the electric power system). FIG. 3 is presenting an example of data stored in the demand database 20. In the example of FIG. 3, the total output required for a plurality of planning periods #1 to #24 are presented. During a planning period, the system needs to provide a certain output value which satisfies the requirement. The operation planning system generates an operation plan for at least one planning period. The number of planning periods included in the operation plan is not limited. The length of each planning period could be constant. Also, the lengths of each planning period could be different.

If the operation planning system is applied to an electric power system, the total output value (total electricity) required in each planning period can be determined based on the demand of electricity. If the surplus output is considered in the generation of operation plan, the values stored in the demand database 20 can be calculated by multiplying a coefficient greater than 1.00 to the demand of electricity. Examples of coefficients are 1.03, 1.05 and 1.08. However, different values can be used as the coefficient.

In the example of FIG. 3, the total output value required in planning period #1 is 901 MW. Similarly, the total output values required in planning period #2, planning period #3 and planning period #4 are 963 MW, 1063 MW and 1209 MW, respectively.

In the example of FIG. 3, the operation planning system generates an operation plan including a plurality of planning periods, ensuring that the total output values required in each of the planning periods are satisfied. The planning periods update of the operation plan is necessary can be specified by flags stored in the demand database 20. Also, data specifying the method for generating the operation plan can be stored in the demand database 20.

The device database 21 stores information of operating devices and planning devices included in the operation planning system. Information of operating devices and planning devices include the registration status of each operating device, the registration status of each planning device, specification of each operating device, error states of each operating device, error states of each planning device, the constraints of the system for each operating device, operation cost functions for each operating device, the priority of each operating device, the priority of each planning device and the priority functions. Here, examples of the specification of each operating device include the minimum rated output and the maximum rated output. Also, information of the methods used by each planning device for generating the combination of operating devices can be stored in the device database 21.

FIG. 4 presents an example of data stored in the device database 21. The table of FIG. 4 includes information of operating devices. The first column of the table in FIG. 4 includes the DEVICE_ID which are identifiers of the operating devices. In the example of FIG. 4, the values of DEVICE_ID are A, B, C, . . . , I and J. Therefore, each of the rows in the table corresponds to an operating device. The table of FIG. 4 includes fields of the minimum rated output of each operating device $P_{min}$, the maximum rated output of each operating device $P_{max}$, the coefficients of the cost functions (a to c), the cold start-up cost BS, the host start-up cost TS, the ramp up rate RU, the ramp down rate RD, the minimum operating time $T_{on}$ and the minimum downtime $T_{off}$. Also, data of the cost functions may be stored in the device database 21.

The cost function $C(P_i)$ is a function which uses the output $P_i$ of the operating device as the parameter. The following equation (1) is an example of the cost function.

$$C(P_i)=a_iP_i^2+b_iP_i+c_i \qquad (1)$$

Here, $a_i$, $b_i$ and $c_i$ are coefficients of cost functions for the operating device i. The cost function of equation (1) is only an example. Thus, costs can be calculated using different functions.

In the device database 21, information defining the constraints of the system of the operating devices is stored. For example the minimum rated output $P_{i,min}$ defines the lower limit of the output setting value. The maximum rated output $P_{i,max}$ defines the upper limit of the output setting value. Therefore, the output setting value for operating device i in the operation plan can be configured within the range of $[P_{i,min}, P_{i,max}]$.

The ramp up rate $RU_i$ and the ramp down rate $RD_i$ define the upper limit of changes allowed for the output setting value, within a single operation. The ramp up rate $RU_i$ is the maximum amount of increase allowed for the output setting value, within a single operation. The ramp down rate $RD_i$ is the maximum amount of decrease allowed for the output setting value, within a single operation. If the system is an electric power system, the ramp up rate $RU_i$ and the ramp down rate $RD_i$ correspond to the rate of change for generated power.

The minimum operating time $T_{on}$ and the minimum downtime $T_{off}$ define the timing when the operating device can operate and the timing when the operating device cannot operate. Before the operating device i is stopped, the continuous running time of the operating device needs to be equal to or greater than the minimum operating time $T_{on,i}$. Before the operating device i is started, the continuous stop time needs to be equal to or greater than the minimum downtime $T_{off}$. As mentioned above, the minimum rated output, the maximum rated output, the ramp up rate, the ramp down rate, the minimum operating time and the minimum downtime are examples of the constraints of the system in the operation plan.

The cold start-up cost BS and the hot start-up cost $TS_i$ are costs required to launch (start) an operating device i. The start-up cost used in the calculation of costs depends on the conditions. If the continuous stop time of the operating device i is shorter than a threshold value, the hot start-up cost TS can be used. If the continuous stop time of the operating device i is equal to or greater than the threshold value, the cold start-up cost BS can be used. Generally, the value of the hot start-up cost TS is smaller than the value of the cold start-up cost BS. Although not presented in the example of FIG. 4, the cost can be calculated by using the shutdown cost which is the cost required to stop an operating device.

The table of FIG. 4 is only an example. Therefore, the device database 21 does not necessary need to have all the fields described above. Also, other fields can be included in the device database 21. Also, the table of FIG. 4 includes information of ten operating devices (DEVICE_ID=A-J). However, the number of operating devices included in the system (for example, electric power system) can be different. For example, if the operation planning system is applied to a large-scale electric power system, the number of operating devices may be in the order of hundreds, thousands or even greater.

The operation plan database 22 stores information of the operation plan for a system (for example, an electric power system). The information stored in the operation plan database 22 includes both the information of the operation plan which is being generated and information of the operation plan the generation process is completed. In the following, various data related to the operation plan is called the operation plan information. Examples of the operation plan information include: the combination of operating devices which can operate, the combination of the operating devices which operate in each planning period, the output setting values of each operating device, the cost of the operation plan which is being generated, flags indicating whether the operation plan which is being generated can be applied to the actual system and the scores calculated for the operation plan which is being generated.

The operation plan information stored in the operation plan database 22 can be updated by each of the planning devices. The planning devices can read and write at least part of the operation plan information stored in the operation plan database 22. Mutual exclusion by using semaphores and locks can be used to handle multiple accesses to the operation plan database 22 from the plurality of planning devices.

Next, examples of data included in the operation plan information are explained with reference to a diagram. FIG. 5 is a diagram explaining an overview of the operation plan generation process. First, the operation planning system generates a combination of operating devices that could operate in the operation plan (table 35). The first row of table 35 includes the DEVICE_ID of each operating device. The second row of table 35 indicates whether each operating device is selected as the operating device which could operate in the operation plan. The value "0" indicates the operating devices which are not selected. The value "1" indicates the operating devices which are selected.

Referring to table 35, the operating devices with DEVICE_ID=B, C, D, E, G, H and I are selected as the operating devices which could operate in the operation plan. In the example of FIG. 5, seven operating devices out of the ten operating devices are selected.

Next, the operation planning system determines the operating devices which are going to be running in each planning period (table 45). Table 45 of FIG. 5 presents operating devices which operate in each planning period. The first column of table 45 includes the DEVICE_ID (B, C, D, E, G, H and I) of each operating device. The first row of table 45 includes the planning periods (#1, #2, #3, . . . , #24) of the operation plan. Each field of table 45 (excluding the first row and the first column) indicate whether each operating device is selected as the operating device which is going to be running in each planning period. In table 45, "1" indicates the operating device which is going to be operating in the corresponding planning period. "0" indicates the operating device which is not going to operate in the corresponding planning period.

Referring to table 45, operating devices with DEVICE_ID=B, E and D are selected as the operating devices which are going to operate in planning periods #1 to #3. Also, operating devices which are going to operate in planning periods #1 to #24 are selected from the combination of operating devices with DEVICE_ID=B, C, D, E, G, H and I, as shown in table 35. If the operation planning system is applied to electric power systems, the table 45 corresponds to the start-stop pattern.

Then, the operation planning system determines the output setting values for the operating devices which are going to be operating in each planning period (table 50). Table 50 of FIG. 5 includes the output setting values of the operating devices which are going to operate in each planning period. The first column of table 50 indicates the DEVICE_ID (B, C, D, E, G, H and I) of each operating device. The first row of table 50 indicates the planning periods (#1, #2, #3, . . . , and #24) of the operation plan. Each field of table 50 (excluding the first row and the first column) indicate the output setting values for each operating device in the corresponding planning period.

Referring to table 50, the output setting value of the operating device with DEVICE_ID=B at planning period #1 is 212 MW. The output setting value of the operating device with DEVICE_ID=E at planning period #1 is 220 MW. The output setting value of the operating device with DEVICE_ID=D at planning period #1 is 469 MW. The sum of the output setting values of the operating devices in planning period #1 is 901 MW. 901 MW is equal to the total output required in planning period #1, as shown in FIG. 3. The sum of the output setting values of the operating devices in planning period #2 is 963 MW. 963 MW is equal to the total output required in planning period #2, as shown in FIG. 3.

Referring to FIG. 3, the total output required in planning period #3 is 1209 MW. However, referring to the maximum rated output of operating devices with DEVICE_ID=B, E and D, the total value is 1120 MW, which is less than the required output. Therefore in planning period #4, the operating device with DEVICE_ID=C is launched (table 50). The output setting values for the operating devices with DEVICE_ID=B, E, D and C are 263 MW, 276 MW, 520 MW and 150 MW, respectively. The sum of the output setting values for the operating devices with DEVICE_ID=B, E, D and C is equal to the required output at planning period #4, which is 1209 MW.

Referring to FIG. 3, the total output required in planning periods #9 and #10 are 1532 MW, which is the maximum value through all the planning periods. Referring to table 50 of FIG. 5, all the operating devices (DEVICE_ID=B, C, D, E, G, H and I) are going to operate in planning periods #9 and #10. In planning periods #9 and #10, the sum of the output setting values are 1532 MW, which is equal to the required output in planning periods #9 and #10. If the operation planning system is applied to electric power systems, table 50 corresponds to the power generation plan (workload balancing plan) of the electric power system.

The example in FIG. 5 shows only a part of the operation plan generation process. In the actual process of the operation planning system, a plurality of start-stop patterns for the planning periods is generated. Then, the output setting values for each of the planning periods in the start-stop patterns are determined. The operation plan which satisfies both the required total output (for example, the demand) and the constraints of the system can be selected as the official operation plan. Here, the official operation plan is the operation plan which is actually going to be applied to the system including operating devices. Also, the official operation plan can be selected based on the cost. For example, from the operation plans satisfying the above conditions, the operation plan with the lowest cost can be selected. Therefore, information including the combination of operating devices, the start-stop patterns of operating devices and the output values of the operating devices are candidates of the official operation plan. Since the workload for the operation plan generation process is balanced across a plurality of planning devices, the computing resources of the planning devices can be utilized effectively. Details of the operation plan generation process are described later.

In the following, the components of the operation planning system are described with reference to FIG. 2. The demand updater 24 and the device data collector 25 are internal components of the processing circuit 23 of the management server 3. The demand updater 24 updates the demand database 20, if the total output required to the system (for example, electric power system) changes. Also, the demand updater 24 notifies the fact that the required total output changed, to each of the planning devices. By receiving the notification message, the planning devices can update the operation plan for the planning periods which have changes in the required total output. The notification messages can be broadcasted to all the planning devices. Also, the notification message can be transmitted to some of the planning devices. The operation plan updating process can include updates of the output setting values for the operating devices operating in the existing operation plans. The operation plan updating process can include changes in the operating devices which are going to be running in a planning period. Also, the operation plan updating process can include the combination of the above. Also, the whole operation plan can be regenerated based on needs.

For electric power systems, the required total output can be changed when the usage rate of air conditioning systems or heating systems increase, thereby increasing the demand for electricity. Such cases may occur when there are rapid changes in the temperature. Also, the required total output can be changed when the actual consumption of electricity starts to diverge from the anticipated values.

The device data collector 25 detects configuration changes and status changes of the system. The device data collector 25 also updates the device database 21. Examples of system configuration changes include additions of operating devices, changes of operating devices, deletion of operating devices, additions of planning devices, changes of planning devices and deletions of planning devices. Examples of status changes in the system include failures of operating devices, failures of planning devices, maintenance outages of operating devices, maintenance outages of planning devices, configuration changes of operating devices and changes in the maximum rated output of the operating devices. The maximum rated output of the operating device can be determined based on the maintenance status and the aging of the devices.

The device data collector 25 notifies the configuration changes and the status changes of the system to each planning device. If the required total output is no longer satisfied after the change, the planning device which receives the notification message starts the updating process of the operation plan. This is similar to the case when the demand updater 24 transmits a notification message. The notification message can be transmitted to all the planning devices. Also, notification message can be transmitted to part of the planning devices.

Next, the components of the planning devices 1a and 1b are described. The components described below are common for each of the planning devices.

The planning devices 1a and 1b each include a processing circuit 11, a communication circuit 15, a storage 16 and an operation controller 17. The processing circuit 11 includes a plan generator 12, a controller 13 and a verifier 14 as internal components.

The processing circuit 11 executes various computations and control processes to enable the feature of the planning device. The processing circuit 11 can be implemented by hardware circuitry including processors (CPUs), ASIC and CPLD. Also, programs such as applications can operate on the hardware circuitry. A combination of hardware circuitry and programs can be used to implement the processing circuit 11.

The communication circuit 15 enables communication of data between other planning devices and the management server 3, via the network 4. Examples of the communication circuit 15 include the NIC (Network Interface Card) and wireless communication modules. However, the type of circuit is not limited.

The storage 16 provides storage space for saving data related to the generation process of the operation plan, data of the operation plan and data of programs operating in the planning device.

However, the type of data saved in the storage 16 is not limited. The storage 16 can be volatile memory such as SRAM or DRAM. The storage 16 can also be nonvolatile memory such as NAND, MRAM or FRAM. The storage 16 can be external storage devices or storage devices such as HDD or SSD. Also, the storage 16 can be a combination of the devices mentioned above.

The operation controller 17 controls the operating device coupled with the planning device, based on the operation plan saved in the storage 16. The interface and the communication standard used by the operation controller 17 for controlling the operating device are not limited. The operation controller 17 can control the operating device by transmitting and receiving electrical signals by interfaces such as PCI Express, USB, UART, SPI, SDIO, serial port and Ethernet. Also, the operation controller 17 can control the operating device by wireless communication.

The operation controller 17 of the planning device does not necessary need to control the operating device by transmitting instructions. For example, the planning device can store the data of the operation plan in the storage 16. Then, the operating device can periodically access the data stored in the storage 16 of the planning device. The planning device can operate based on the data in storage 16. Also, the operating device can request the data of the operation plan to the planning device. The planning device can respond to the request by transmitting the data of the operation plan to the operating device. The timing when the operating device transmits the request is not limited.

The users can confirm the operation plan generated by the planning device by referring to a display. Then, the operating device can be controlled manually by the user, according to the operation plan. Also, the data of the operation plan can be moved from the planning device to the operating device by using removable storage media. Thereby, the control program of the operating device runs based on the data stored in the removable storage media. As long as the operating device can be controlled based on the operation plan generated by the planning devices, the methods used for controlling the operating device and the type of interfaces used between the operating device and the planning device are not limited.

Next, internal components of the processing circuit 11 are described.

The plan generator 12 executes: the process of generating the combination of operating devices; the process of selecting the operating devices which operate in each planning period, from the combination of operating devices, generating the start-stop patterns of operating devices; the process of determining the output setting values of the operating devices in each planning period; and the process of updating the operation plan. Thereby, the plan generator 12 can generate the operation plan information. Examples of the operation plan information are presented in FIG. 5. The plan generator 12 saves the generated data (operation plan information) to the storage 16 or the operation plan database 22 of the management server 3. Data including the combination of the operating devices stored in the operation plan database 22 are shared with other planning devices. Based on needs, the plan generator 12 can read the shared operation plan information stored in the operation plan database 22 of the management server 3.

For example, the plan generator 12 can generate combinations of operating devices by using the combination of operating devices generated by the other planning devices, stored in the operation plan database 22. The data of a combination of operating devices generated by the other planning devices is called the combination data. Also, the plan generator 12 can select combinations of operating devices from the combination of operating devices generated by the other planning devices, stored in the operation plan database 22. For example, the plan generator 12 can generate new combinations of operating devices based on the existing combinations of operating devices by using methods including genetic algorithms (GA) and reinforcement learning and particle swarm optimization (PSO). However, the methods described above are only examples. Thus, the plan generator 12 can use other methods to generate the combination of operating devices.

The controller 13 can specify the planning device which executes the steps of the operation plan generation process. Also, the controller 13 can determine whether the execution of the operation plan generation process is necessary. If it is determined that the execution of the operation plan generation process is necessary, the controller 13 can transmit instructions requesting the execution of the operation plan generation process to other planning devices. The controller 13 can specify the planning device which generates the combination of operating devices. The controller 13 may grant the authority to generate the combination of operating devices to other planning devices. Also, the controller 13 can specify the planning device which determines the output setting values of the operating devices. The controller 13 can specify the planning device which calculates the costs and the scores of the operation plan. The controller 13 can select the planning devices which executes a specific process (for example, generating combinations of operating devices) based on the priority of the operating devices or the planning devices, stored in the device database 21.

The verifier 14 confirms whether the generated candidate operation plan satisfies the constraints of the system. The candidate operation plans satisfying the constraints of the system can be selected as the official operation plan. If the generated candidate of the operation plan satisfies the constraints of the system, the verifier 14 sets the applicability flag corresponding to the candidate operation plan to "1". If the generated candidate of the operation plan does not satisfy the constraints of the system, the verifier 14 sets the applicability flag corresponding to the candidate operation plan to "0". The verifier 14 can request the update of the candidate operation plan if the candidate operation plan does not satisfy the constraints of the system. When the candidate operation plan is updated, the output setting values of the operating devices can be updated. Also, when the candidate operation plan is updated, the operating devices running in a planning period can be changed. The combination of the above processes can be executed when the candidate operation plan is updated.

Also, the verifier 14 calculates the costs and the scores of the generated candidate operation plans. The verifier 14 stores the values of the applicability flags, the costs and the scores of the candidate operation plans to the operation plan database 22 of the management server 3. As a penalty, the verifier 14 can increase the value of costs for the candidate operation plans which do not satisfy the constraints of the system. Thereby, candidate operation plans can be excluded from selection. Also, the priority that the candidate operation plan is selected can be lowered.

Next, details of the operation plan generation process are described. FIG. 6 is a diagram explaining an example of a process generating a combination of operating devices. In the following, the process of generating a combination of operating devices is described with reference to FIG. 6.

The combinations of operating devices are generated based on the required total output for each planning period (for example, the demand database in FIG. 3) and the information of the device database (for example, FIG. 4). When the operating devices included in the combination are selected, the operating devices with lower operating costs can be selected with higher priorities. Here, $C(\ldots)$ is the cost function of equation (1). $P_{max,i}$ indicate the maximum rated output of the operating device i.

The average operating cost function avg($P_i$) shown in equation (2) below can be used as the criteria for selecting operating devices.

$$avg(P_i) = \frac{C(P_{max,i})}{P_{max,i}} \qquad (2)$$

Here, C( . . . ) is the cost function of equation (1). $P_{max,i}$ indicate the maximum rated output of the operating device i.

By using equation (2), the average operating cost for each operating device can be calculated. The average operating costs for operating devices with DEVICE_ID=A, B, C, D, E, F, G, H, I and J are 1.92, 2.34, 2.20, 2.26, 2.34, 2.05, 2.13, 2.15, 2.13 and 1.96, respectively. If the operating devices with the lowest operating costs are selected, the priority of selection would be in the order of A, J, F, G, I, H, C, D, E and B.

Then, the operating devices are selected. Referring to FIG. 3, the minimum value of the required total output in the planning periods is $P_{load,min}$=878 MW. The maximum value of the required total output in the planning periods is $P_{load,max}$=1532 MW. To ensure that the required total outputs are satisfied for each of the planning periods, the operating devices are selected under the restrictions shown in the following equations (3) and (4).

$$\sum_i P_{i,min} \leq P_{load,min} \qquad (3)$$

$$P_{load,max} \leq \sum_i P_{i,max} \qquad (4)$$

Here, $P_{i,min}$ is the minimum rated output of the operating device i. $P_{i,max}$ is the maximum rated output of the operating device i. Here, "i" is a variable which stores the identifiers of each operating device such as the DEVICE_ID.

The table 30 in FIG. 6 includes a plurality of combinations of operating devices. If the operating devices are selected by using the average operating cost calculated based on equation (2), all of the 10 operating devices need to be selected in order to satisfy the condition of equation (4), as shown in row 31. Therefore, the selection of the operating device with DEVICE_ID=A can be skipped and the operating device of DEVICE_ID=J with the next priority can be selected instead. Then, the nine operating devices satisfy the conditions of equations (3) and (4), as shown in row 31*a*.

If the selection of the operating device with DEVICE_ID=J is skipped and the operating device of DEVICE_ID=F with the next priority is selected, it is possible satisfy the conditions of equations (3) and (4) by using eight operating devices (DEVICE_ID=F, G, I, H, C, D, E and B). By reducing the number of operating devices, it is possible to simplify the operation plan. Therefore, the operating devices which can be used are selected from the combination of operating devices shown in row 31*b*.

Next, subsets of the eight operating devices (DEVICE_ID=F, G, I, H, C, D, E and B) are generated. In table 32 of FIG. 6, a plurality of subsets is generated based on the priority. First, the operating device with the second highest priority (DEVICE_ID=G) is added to the operating device with the highest priority (DEVICE_ID=F, the subset in the first row), generating the subset in the second row.

Then, the operating device with the third highest priority (DEVICE_ID=I) is added to the subset in the second row, generating the subset in the third row. By repeating processes similar to above, eight subsets can be generated.

Since all of the eight operating devices are needed to be used in order to satisfy the condition of equation (4), the combination including all of the operating devices (DEVICE_ID=F, G, I, H, C, D, E and B) is selected as the combination to be used (row 33, the subset in the eighth row). If a plurality of subsets which satisfy the conditions of equation (3) and equation (4) exists, a plurality of combinations can be selected as the combinations which are used.

Table 34 in bottom of FIG. 6 presents the combination of operating devices (DEVICE_ID=F, G, I, H, C, D, E and B) which are selected as the combination to be used in bit format. The operating devices with bit values "1" are devices which are going to be used. The operating devices with bit values "0" are devices which are not going to be used. Also, "COMBINATION: 510" shown below the table 34 is the value of the bits converted to decimal value expression from binary value expression. In the following explanation, the selected combination of operating devices is represented by using the decimal value expression.

The process of generating operating devices described above is only an example. Therefore, the combination of operating devices can be generated by using other methods. For example, operating devices can be selected randomly to generate a plurality of combinations. The combinations which satisfy the conditions of equation (3) and equation (4) can be extracted from the plurality of combinations.

Next, an example of the process which determines the operating devices which will operate in each planning period is described with references to FIG. 7 and FIG. 8. The process of FIG. 8 corresponds to the process which determines the start-stop pattern of the operating devices by using a specific combination of operating devices.

In the example of FIG. 7 and FIG. 8, the operating devices which are going to operate in each planning period are determined by using the combination of operating devices with "COMBINATION: 510" (DEVICE_ID=F, G, I, H, C, D, E and B).

In the initial stage of FIG. 7 and FIG. 8, all the operating devices (DEVICE_ID=F, G, I, H, C, D, E and B) are configured to operate in the planning periods j=1 to 24 (table 46 of FIG. 7). In the process described in FIG. 8, the planning periods at which each operating device can be stopped are searched based on the constraints of the operating devices and the total output required in each of the planning periods.

Examples of the constraints of the system of the operating devices include the minimum operating time $T_{on,i}$ and the minimum downtime $T_{off,i}$. The planning period the operating device i may stop can be specified by comparing the length of each planning period $TL_j$ and the minimum operating time $T_{on,i}$ and the minimum downtime $T_{off,i}$ of operating device i. In the example of FIG. 8, the operating device with DEVICE_ID=F could stop at all the planning periods j=1 to 24. Therefore, the operating device with DEVICE_ID=F is configured to stop at all the planning periods (tables 41 and 42). The operating device which is configured to stop at all the planning periods can be deleted from the combination of operating devices.

Regarding the operating device with DEVICE_ID=G, it can be inferred that the operating device could stop at planning periods j=1 to 6 and 14 to 24 (tables 43 and 44). Similarly, the planning periods the operating devices with DEVICE_ID=I, H and C could stop are specified (table 45).

For the operating devices with the largest maximum rated outputs within the generated combination, the process of specifying the planning periods the operating devices could stop are not executed (refer to FIG. 4). In electric power systems, the operating devices of DEVICE_ID=D, E and B correspond to the power generators which provide the base load power. Generally, the power generators which provide the base load power tend to operate continuously for a long period.

As shown in example of FIG. 8, the process of specifying planning periods the operating device may stop can be skipped for some of the operating devices. Also, the process of specifying planning periods at which an operating device may stop can be executed for all the operating devices. Different criteria can be used for selecting the operating devices for the execution of the above process is skipped. Examples of the criteria include: when the start-up cost is greater than the threshold value; when the shutdown cost is greater than the threshold value; when the value of the average operating cost is smaller than the threshold value; when the maximum rated output is greater than the threshold value; and when the difference between the maximum rated output and the minimum rated output is greater than the threshold value. However, any other criteria can be used.

If the planning periods when the operating devices belonging to the combination may stop are specified, it is confirmed whether the following equation (5) is satisfied for each planning period 1.

$$\sum_{i(j)} P_{i,min} \le P_{load,j} \le \sum_{i(j)} P_{i,max} \quad (5)$$

Here, $\Sigma_{i(j)}$ means that the sum of the minimum rated output or the maximum rated output is calculated for the operating devices i which are going to be operating in planning period j.

The condition of equation (5) means that the sum of the minimum rated outputs of the operating devices configured to operate at planning period j is equal to or smaller than the total output value required in planning period j, and the sum of the maximum rated outputs of the operating devices configured to operate at planning period j is equal to or greater than the total output value required in planning period j. By using the equation (5), it is possible to confirm whether the output provided from the operating devices configured to operate in planning period j satisfies the value of total output required in the planning period.

If either of the planning periods does not satisfy the condition of equation (5), the operating devices which are going to operate or stop can be changed for the corresponding planning period. For the planning periods the operating devices which are going to operate or stop need to be changed, it is confirmed whether the constraints of the system such as the minimum operation time and the minimum downtime are still satisfied after the change. If the constraints of the system are satisfied, the change is reflected to the actual start-stop pattern of the operating device. If the constraints of the system are not satisfied, other operating devices are selected as the operating devices which are going to operate or stop during the planning period.

By executing the above process, the start-stop patterns of the operating devices can be generated based on the combination of the operating devices (for example, table 45). If the operation planning system generates a plurality of combinations, each of the combinations can be used to generate start-stop patterns of the operating devices.

The process of generating combinations of operating devices shown in FIG. 6 and the process of generating start-stop patterns of operating devices can be executed by a single planning device or a plurality of planning devices.

Figure 9:
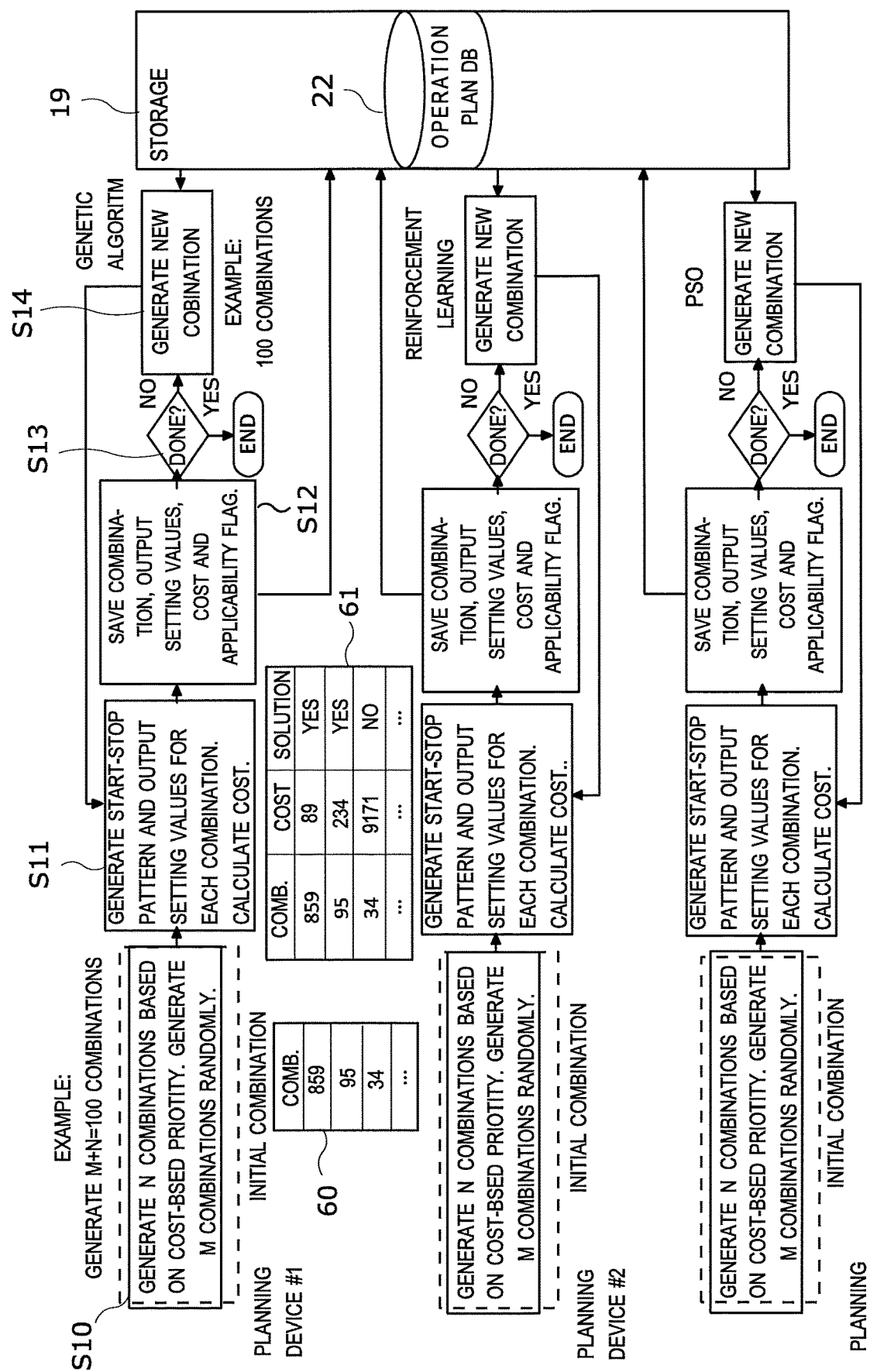
FIG. 9 is a flowchart explaining an example of a process generating an operation plan according to the first embodiment.

Next, the overall process for generating the operation plan is described. FIG. 9 is a flowchart explaining an example of a process generating an operation plan according to the first embodiment. In the process shown in FIG. 9, a plurality of planning devices operates concurrently to generate the operation plan.

First, the controller 13 of any of the planning devices transmits the instruction to start the generation of the operation plan, if the generation of the operation plan is necessary. Each planning device which receives the instruction executes the process of step S10 in FIG. 9. In step S10, each planning device generates N combinations of operating devices using cost-based priority values. Also, each planning device generates M combinations of operating devices by selected the operating devices randomly. Thereby, each planning device generates M+N combinations of operating devices. Here, the values of M and N are not limited.

Table 60 of FIG. 9 includes examples of the combinations generated in step S10. If the decimal number expression COMBINATION: 859 is converted to binary number expression, the bit string, "1101011011" can be obtained. This bit string corresponds the combination of operating devices including operating devices of DEVICE_ID=A, B, D, F, G, I and J. Also, if the decimal number expression COMBINATION: 95 is converted to binary number expression, the bit string, "0001011111" can be obtained. This bit string corresponds to the combination of operating devices including operating devices of DEVICE_ID=D, F, G, H, I and J.

Next, the plan generators 12 of each planning device generate the start-stop patterns by using each combination. Then, the plan generators 12 of each planning device determine the output setting values for the generated start-stop patterns. Also, the plan generators 12 of each planning device calculates the cost if the system is operating according to the corresponding condition (step S11). Here, the verifier 14 also confirms whether the candidate plan satisfies the constraints of the system. According to the results, the verifier 14 sets the values of the applicability flags.

Then, each planning device saves the combination of operating devices, start-stop patterns, output setting values, costs and values of the applicability flags to the operation plan database 22 of the management server 3 (step S12). Thereby, each planning device can obtain information on the combination of operating devices, start-stop patterns, output setting values, costs and values of the applicability flags, generated by other planning devices. Details on the methods for determining the output setting values of the operating devices are described later.

Table 61 of FIG. 9 shows candidate operation plans generated in step S11. For COMBINATION: 859, the value of the cost is 89. This candidate operation plan satisfies the constraints of the system. For COMBINATION: 95, the value of the cost is 234. This candidate operation plan also satisfies the constraints of the system. For COMBINATION: 34, the generated candidate operation plan does not satisfy the constraints of the system. Therefore, a penalty was applied, setting the cost to 9171, which is a large value.

Then, each planning device determines whether the operation plan generation process can be finished (step S13). Examples of the conditions for finishing the process include:

whether there are candidate operation plans which satisfy the constraints of the system; whether the number of candidate operation plans satisfying the constraints of the system is reaching the threshold value; and whether the value of the loop counter is reaching the threshold value. However, any type of condition can be used. After the operation plan generation process is finished in step S13, the candidate operation plan which satisfies the constraints of the system (the value of the applicability flag is "1") is selected as the official operation plan. Then, the system can be actually operated according to the official operation plan.

If it was determined that the operation plan generation process cannot be finished in step S13, each planning device uses combinations of operating devices stored in the operation plan database 22 to generate new combinations of operating devices (step S14). For example, it is possible to generate a hundred combinations of operating devices in step S14. However, the number of generated combinations is not limited. Also, each planning device can use different methods to generate the combination of operating devices.

In the example of FIG. 9, planning device #1 is generating different combinations of operating devices by using genetic algorithms. Planning device #2 is generating different combinations of operating devices by using reinforcement learning. Planning device #3 is generating different combinations of operating devices by using particle swarm optimization (PSO). These methods are only examples. Therefore, different methods can be used to generate more combinations of operating devices.

If each planning device generates new combinations of operating devices in step S14, the process returns to step S11. In step S11, the output setting values are determined for the generated combinations. Also, the cost required when the system operates according to the candidate operation plan is calculated. It is confirmed whether the candidate operation plan satisfies the constraints of the system.

In the process of step S10, measures for preventing different planning devices from generating the same combination of operating devices can be executed. For example, numbers, identifiers or priorities of the planning devices stored in the device database 21 can be used to ensure that each planning device can exclude different operating devices when selecting operating devices which belong to the combinations.

Figure 10:
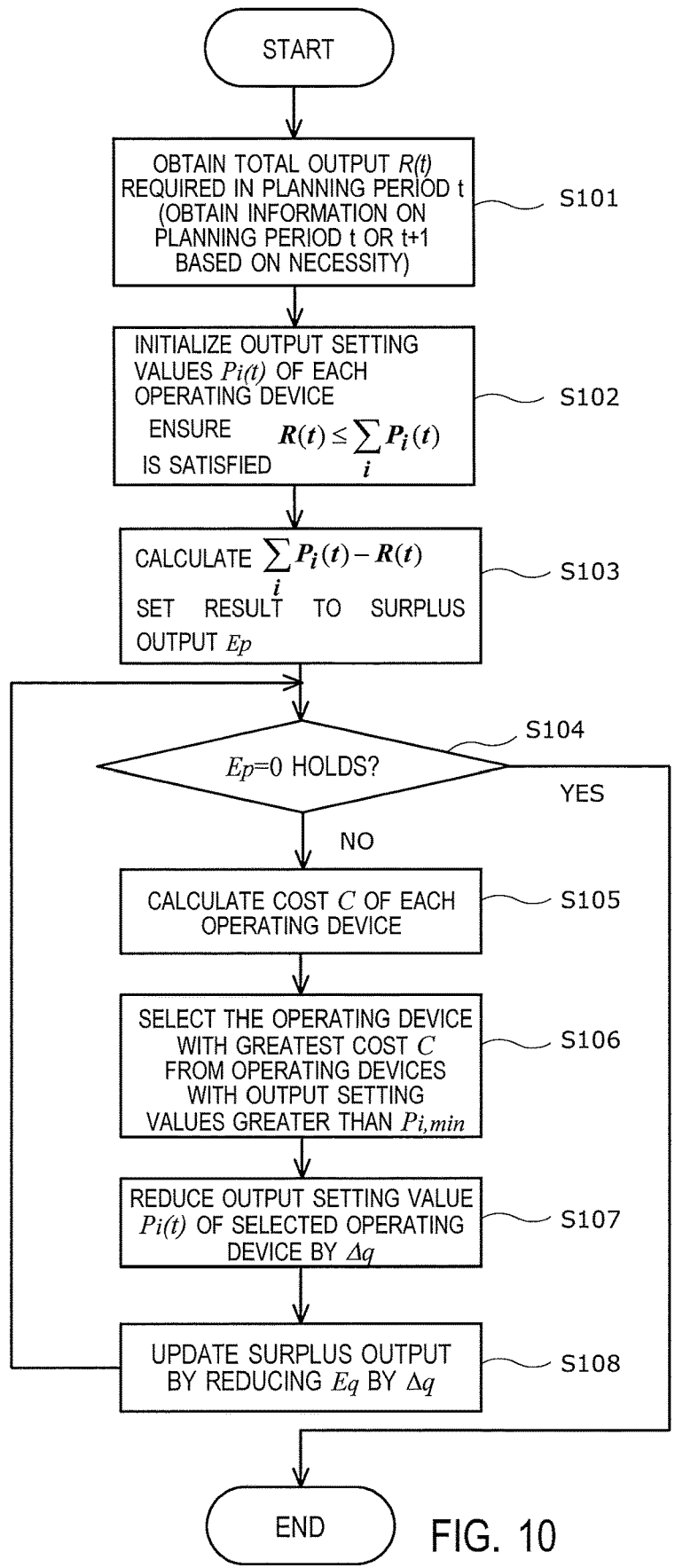
FIG. 10 is a flowchart explaining an example of process determining the output setting values for each operating device.

Next, the method for determining the output setting values of the operating devices is described. FIG. 10 is a flowchart explaining an example of process determining the output setting values for each operating device. The flowchart of FIG. 10 is a detailed description of part of the process executed in step S11 of FIG. 9. In the following, the process is described with reference to FIG. 10.

First, each planning device refers to the demand database 20 to obtain the value of the total output R(t) required in planning period t (step S101).

If the output setting values of the operating devices are determined for at least either planning period t−1 or planning period t+1, the operation plan information of either the planning period t−1 or planning period t+1 can be obtained from the operation plan database 22. Then, the planning device obtains data including the maximum rated output of each operating device, the minimum rated output of each operating device, the ramp up rate of each operating device and the ramp down rate of each operating device. Based on the above data, the output setting values of the operating devices for either planning period t−1 or planning period t+1; the combination of operating devices which are going to operate; the maximum configurable total value of the output setting value $O_{t,max}$; and the minimum configurable total value of the output setting value $O_{t,min}$ can be specified for the planning period t.

Therefore, if the output setting values of the operating devices are determined for at least either planning period t−1 or planning period t+1, the total output setting values of the operating devices in planning period t is configured to a value which is equal to or greater than the required total output R(t) in planning period t and within the range of $[O_{t,min}, O_{t,max}]$.

Next, the output setting values $P_A(t)$ which are going to operate in planning period t are initialized (step S102). Here, the output setting values for each operating device are initialized to a value within the range of $[P_{i,min}, P_{i,max}]$. Also, in step S102, the sum of the output setting values $\Sigma P_i(t)$ for the operating devices are configured to a value which is equal to or greater than the total output R(t) required in planning period t. In step S102, the output setting values of each operating device can be set to the maximum rated outputs $P_{i,max}$. Also, the output setting values of each operating device can be set to ensure that $\Sigma P_i(t)$ equals to $O_{t,max}$ mentioned above.

Then, the surplus output $E_p$ is calculated by subtracting R(t) from the sum of the output setting values $\Sigma P_i(t)$ (step S103). In the following process, the subtraction of the output setting value $P_i(t)$ for any of the operating devices are repeated until the surplus output $E_p$ is equal to 0.

In step S104, it is confirmed whether the surplus output $E_p$ is 0. If $E_p=0$, the process of determining the output setting values of the operating devices is finished (YES in step S104). If $E_p>0$, the cost C of the operating device is calculated (step S105). The cost C is calculated by substituting the current output setting value $P_i(t)$ to the cost function of equation (1). However, this calculation method is only an example. Therefore, it is possible to calculate the cost C by using a different method. As long as $\Sigma P_i(t)$ is updated to a value greater than R(t), the termination condition in step S104 can be set to $E_p=r$ (r>0).

Next, from the operating devices with output setting values $P_i(t)$ greater than the minimum rated output $P_{i,min}$, the operating device with the greatest cost C is selected (step S106). Then, the output setting value $P_i(t)$ of the selected operating device is reduced by $\Delta q$ (step S107). The adjusted amount $\Delta q$ takes a positive value. Examples of the adjusted amount $\Delta q$ include values such as 0.1, 0.2, 0.5 and 1.0. However, different values can be used. The adjusted amount $\Delta q$ can be a constant value. Also, the adjusted amount $\Delta q$ can be a parameter. Then, the surplus output $E_p$ is reduced by $\Delta q$, updating the surplus output $E_p$ (step S108).

If the value of the surplus output $E_p$ is updated, the judgment of step S104 is executed again to confirm whether the value of the surplus output $E_p$ is 0. If the surplus output $E_p$ is greater than 0, the process of step S105 and the later steps are executed again.

If the scale of the system (for example, electric power system) becomes greater, the number of combinations of operating devices which need to be searched in the generation process and the updating process of the operation plan becomes enormously large. Similarly, the number of patterns of workload balancing (assignment of output setting values to each operating device) which need to be searched also becomes enormously large. For a system including n operating devices, the number of combinations of operating devices which are selectable reaches a total of $2^n$ patterns.

Therefore, if the process of generating and updating the operation plan is concentrated in a specific computer such as the management server, the time required to generate or update the operation plan becomes very long. Also, due to factors such as limited computing resources, only a limited number of combinations of operating devices and patterns of workload may be evaluated in the process. In such cases, it becomes difficult to generate a cost-efficient operation plan within the required time limit.

The operation planning system according to the embodiment utilizes the computing resources of the plurality of planning devices to generate the operation plan. Thereby, the number of combinations of operating devices and the number of patterns of workload used during the process can be increased. Then, a cost-efficient operation plan satisfying the constraints of the system can be generated in a short period.

Also, in the operation planning system according to the embodiment, pairs of the operating device and the planning device can be added for scaling out both the computing resource and the output of the system. Therefore, if the scale of the system expands, it can be assured that the computing resources are sufficient for generating and updating the operation plan.

Second Embodiment

In the operation planning system according to the first embodiment, a plurality of planning devices was executing the operation plan generation process concurrently. However, methods different from the first embodiment can be used to balance the workload of the process across the plurality of planning devices. In the second embodiment, a specific planning device generates a plurality of combinations of operating devices. Then, each planning device uses the assigned combination of operating devices to: generate the start-stop patterns; determine the output setting values; calculate the costs; and confirm whether the constraints of the system are satisfied.

Figure 11:
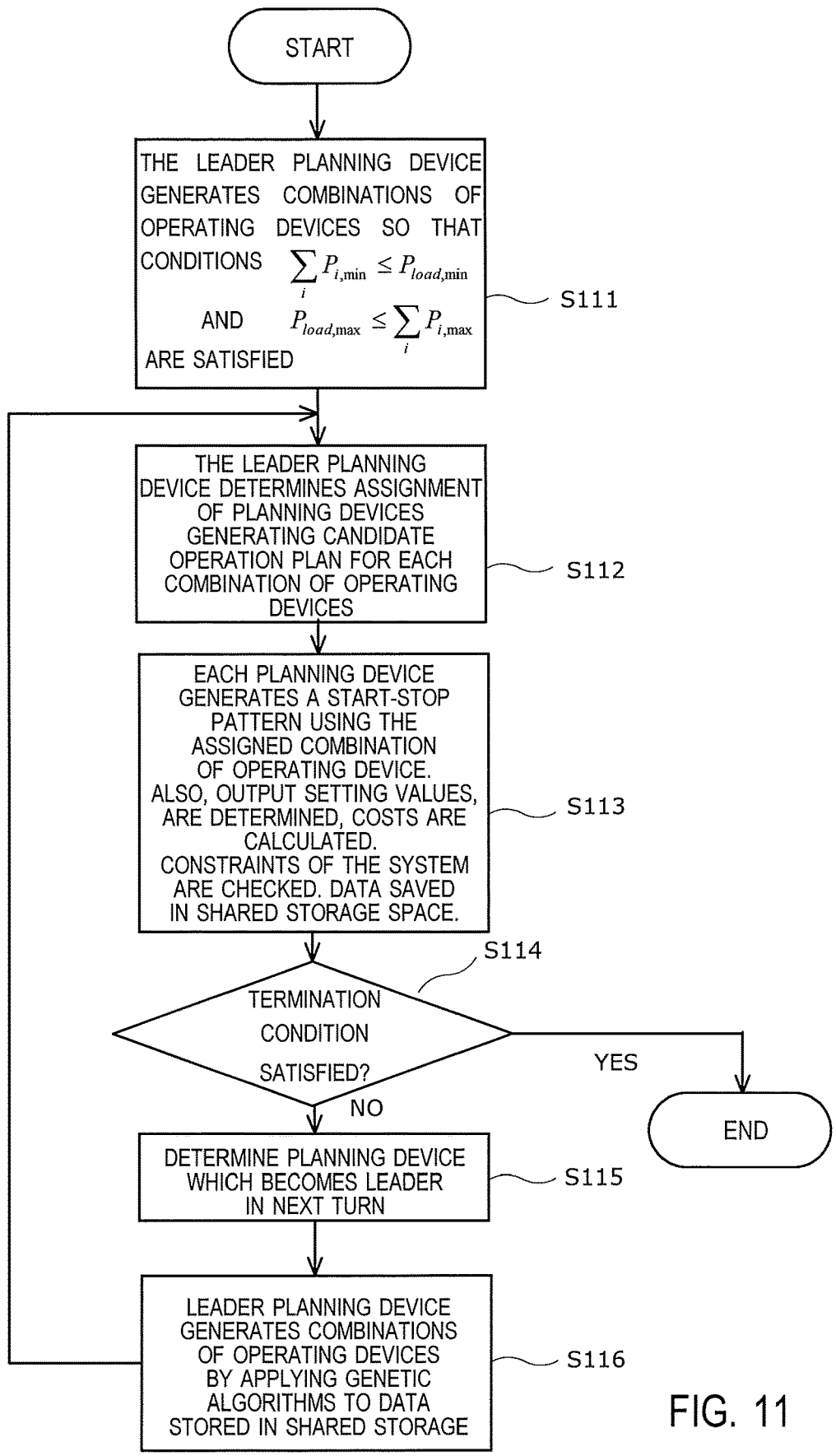
FIG. 11 is a flowchart explaining an example of a process generating an operation plan according to a second embodiment.

FIG. 11 is a flowchart explaining an example of a process generating an operation plan according to a second embodiment. In the following, the process is explained with reference to the flowchart of FIG. 11.

In the following, the planning device with the authority to generate the combination of operating devices is called the leader planning device. Any of the planning devices can be configured as the leader planning device. The leader planning device can be changed during the execution of operation plan generation process.

First, the leader planning device generates a plurality of combinations of operating devices which satisfies the condition of equation (3) and equation (4) (step S111). The leader planning device can be determined based on the priority of the planning device stored in the device database 21. Also, the leader planning device can be selected randomly. Thus, the leader planning device can be selected by using any method.

Next, the leader planning device determines assignment of planning devices which generates the candidate operation plans for each combination of operating devices (step S112). Here, the generation of the candidate operation plans includes the process of: configuring the output setting values for a combination of operating devices; calculating the cost; and verifying whether the constraints of the system are satisfied. In step S112, the process of generating the candidate operation plan for some of the combinations can be assigned to the leader planning device. Also, in step S112, the leader planning device can be excluded from the assignment of processes for generating the candidate operation plans.

Information of the assignments is notified to each planning device. The notification of assignments can be included in the messages transmitted to each planning device. Also, information of the assignment can be written to the operation plan database 22. Then, each planning device can obtain information of the assignment by accessing the operation plan database 22.

Then, each planning device generates a start-stop pattern for the assigned combination of operating devices. Then, the output setting values are determined for the generated start-stop pattern. Also the calculation of cost is executed. It is confirmed whether the constraints of the system are satisfied. Each planning device saves the generated operation plan information to shared storage space (operation planning database 22) (step S113). If the candidate operation plans are generated by each planning device, the leader planning device confirms whether the termination condition of the process is satisfied (step S114). Examples of the termination condition include: whether candidate operation plans satisfying the constraints of the system exists; whether the number of candidate operation plans satisfying the constraints of the system are reaching the threshold value; and whether the number of repeat count is reaching the threshold value. However, any condition can be used as the condition for termination.

If the termination condition is satisfied, the process of FIG. 11 is finished (YES in step S114). If the termination condition is not satisfied (NO in step S114), the planning device which becomes the leader planning device in the next turn is determined (step S115). The planning device which becomes the leader in the next turn can be a planning device which is different from the leader planning device in the previous turn. Also, the planning device which becomes the leader in the next turn can be the planning device which was the leader planning device in the previous turn. Similar to step S111, the method used to determine the leader planning device is not limited.

Then, the planning device which is selected as the leader in the next turn generates combinations of operating devices by applying genetic algorithms to operation plan information stored in the operation plan database 22 (shared storage space) (step S116). If the combination of operating devices is generated additionally, the leader planning device determines the assignment of processes (step S112). Here, the assignment of processes includes the combination of operating devices each planning device uses to generate the candidate operation plans. The process of step S112 and the later steps are executed, using the combinations of operating devices which are generated additionally.

Figure 12:
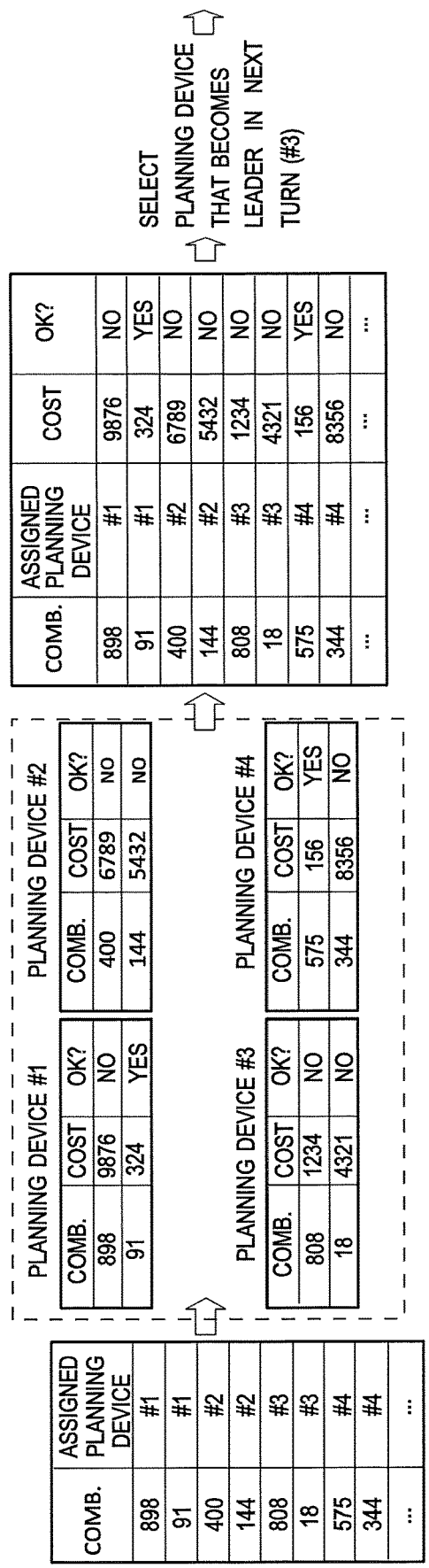
FIG. 12 is a diagram presenting an example of data generated in the operation plan generation process according to the second embodiment.
Figure 13:
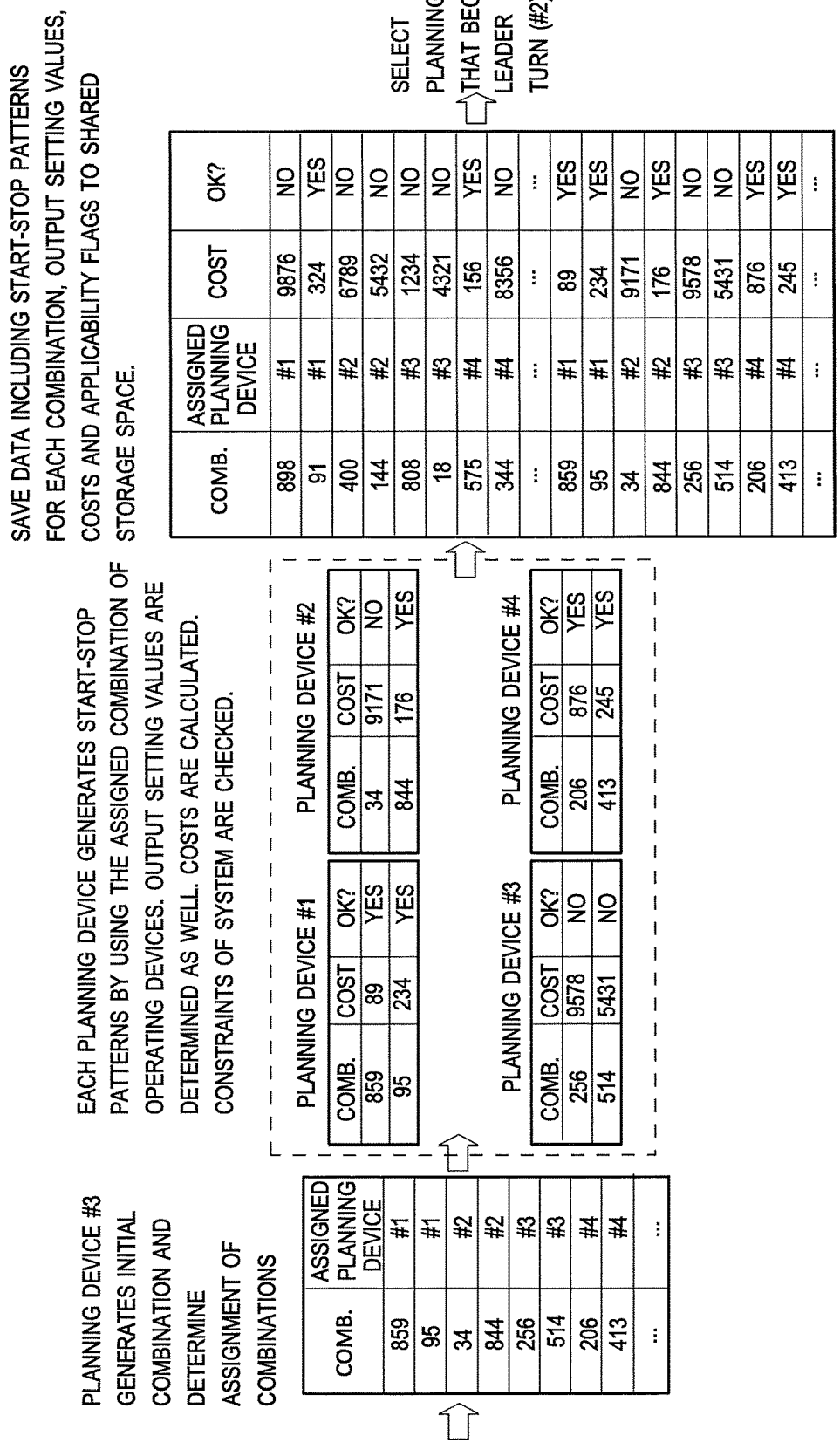
FIG. 13 is a diagram presenting an example of data generated in the operation plan generation process according to the second embodiment.

In the following, an example when the process explained in the flowchart of FIG. 11 is applied to actual data is described. FIG. 12 and FIG. 13 are diagrams presenting an example of data generated in the operation plan generation process according to the second embodiment. In the following, FIG. 12 is referred accordingly for explaining the process.

In the example of FIG. 12, planning device #1 is selected as the leader in the initial stage. The plan generator 12 of the planning device #1 generates a plurality of combinations of operating devices. Then, the controller 13 of the planning device #1 determines the planning device which is in charge of generating the candidate operation plan for each combination of operating devices. Next, the controller 13 of the planning device #1 notifies each planning device information of the combinations of operating devices. Also, the controller 13 of the planning device #1 transmits instructions requiring the process of determining the output setting values, calculation of cost and verification of the constraints of the system, to each planning device.

The planning device #1 can save information of the generated combinations of the operating devices to the operation plan database 22 (shared storage space). Then, the planning device #1 can transmit instructions requesting each planning device to access the operation planning database 22 to obtain information of the assigned combination of operating devices.

In the example of FIG. 12, COMBINATION: 898 and COMBINATION: 91 are assigned to planning device #1. COMBINATION: 400 and COMBINATION: 144 are assigned to planning device #2. COMBINATION: 808 and COMBINATION: 18 are assigned to planning device #3. COMBINATION: 575 and COMBINATION: 344 are assigned to planning device #4. By using the assigned combination of operating devices, each planning device generates start-stop patterns. Then, each planning device determines the output setting values for the start-stop patterns. Also, calculation of cost and verification of the constraints of the system are executed by each planning device.

Then, each planning device saves the start-stop patterns, output setting values, costs and applicability flags for each combination of operating devices, to the operation plan database 22 (shared storage space). If the generated candidate operation plan is satisfying the constraints of the system, the value of the applicability flag is set to "1". If the generated candidate operation plan does not satisfy the constraints of the system, the value of the applicability flag is set to "0". Each planning device can save the operation plan information corresponding to the candidate operation plans with values of the applicability flags set to "1", to the operation plan database 22. Also, each planning device can save the operation plan information corresponding to all the candidate operation plans, to the operation plan database 22.

After the operation plan information is saved by each planning device, planning device #1 confirms whether the termination condition of the process is satisfied. In the example of FIG. 12, candidate operation plans with values of the applicability flag set to "1" is generated. However, it was determined that the termination condition of the process is not satisfied. Therefore, the planning device #1 continues to execute the process. Then, planning device #1 which is the leader planning device determines the planning device which becomes the leader in the next turn. In the example of FIG. 12, planning device #3 is selected as the planning device which becomes the leader in the next turn. If the leader planning device is determined based on the priority stored in the device database 21, the values of the priority can be updated.

In the following, the process is described with reference to FIG. 13.

The plan generator 12 of the planning device #3 which became the leader generates a plurality of combinations of operating devices. Then, the controller 13 of the planning device #3 determines the planning device which is in charge of generating the candidate operation plans for the generated combinations of operating devices. Next, the controller 13 of the planning device #3 notifies each planning device information of the combinations of operating devices. Also, the controller 13 of the planning device #3 transmits instructions requesting the process of: determining the output setting values; calculation of cost; and verification of the constraints of the system to each planning device.

The planning device #3 can save information of the generated combinations of the operating devices to the operation plan database 22 (shared storage space). Then, the planning device #3 can transmit instructions requesting each planning device to access the operation planning database 22 to obtain information of the assigned combination of operating devices.

In the example of FIG. 13, COMBINATION: 859 and COMBINATION: 95 are assigned to planning device #1. COMBINATION: 34 and COMBINATION: 844 are assigned to planning device #2. COMBINATION: 256 and COMBINATION: 514 are assigned to planning device #3. COMBINATION: 206 and COMBINATION: 413 are assigned to planning device #4. By using the assigned combination of operating devices, each planning device generates start-stop patterns. Then, each planning device determines the output setting values for the start-stop patterns. Also, calculation of cost and verification of the constraints of the system are executed by each planning device.

Then, each planning device stores the start-stop patterns, output setting values, costs and applicability flags for each combination of operating devices, to the operation plan database 22 (shared storage space). Each planning device can save the operation plan information corresponding to the candidate operation plans with values of the applicability flags set to "1", to the operation plan database 22. Also, each planning device can save the operation plan information corresponding to all the candidate operation plans, to the operation plan database 22. By executing the process of FIG. 13, it is possible to increase the number of candidate operation plans stored in the operation plan database 22.

After the operation plan information is saved by each planning device, planning device #3 confirms whether the termination condition of the process is satisfied. In the example of FIG. 13, candidate operation plans with values of the applicability flag set to "1" is generated. However, it was determined that the termination condition of the process is not satisfied. Therefore, the planning device #3 continues to execute the process. Then, planning device #3 which is the leader planning device determines the planning device which becomes the leader in the next turn. In the example of FIG. 13, planning device #2 is selected as the planning device which becomes the leader in the next turn.

In the second embodiment, the leader planning device is generating the combination of operating devices. Then, the leader planning device determines the assignment of combinations of operating devices each planning device uses to generate the candidate operation plans. Each planning device could generate operation plans by using unique combinations of operating devices. By executing this assignment process, the use of the same combination of operating devices by a plurality of planning devices for generating the candidate operation plans could be avoided. If the number of operating devices is large, the size of the searched space also becomes large ($2^n$ combinations). Therefore, by using the second embodiment, the possibility that an operation plan with low costs and desired characteristics is generated becomes greater.

Third Embodiment

The operation planning system can be configured to ensure that the process according to the first embodiment and the process according to the second embodiment are selectable. In the operation planning system according to the third embodiment, the method used for generating the operation plan is selectable.

Figure 14:
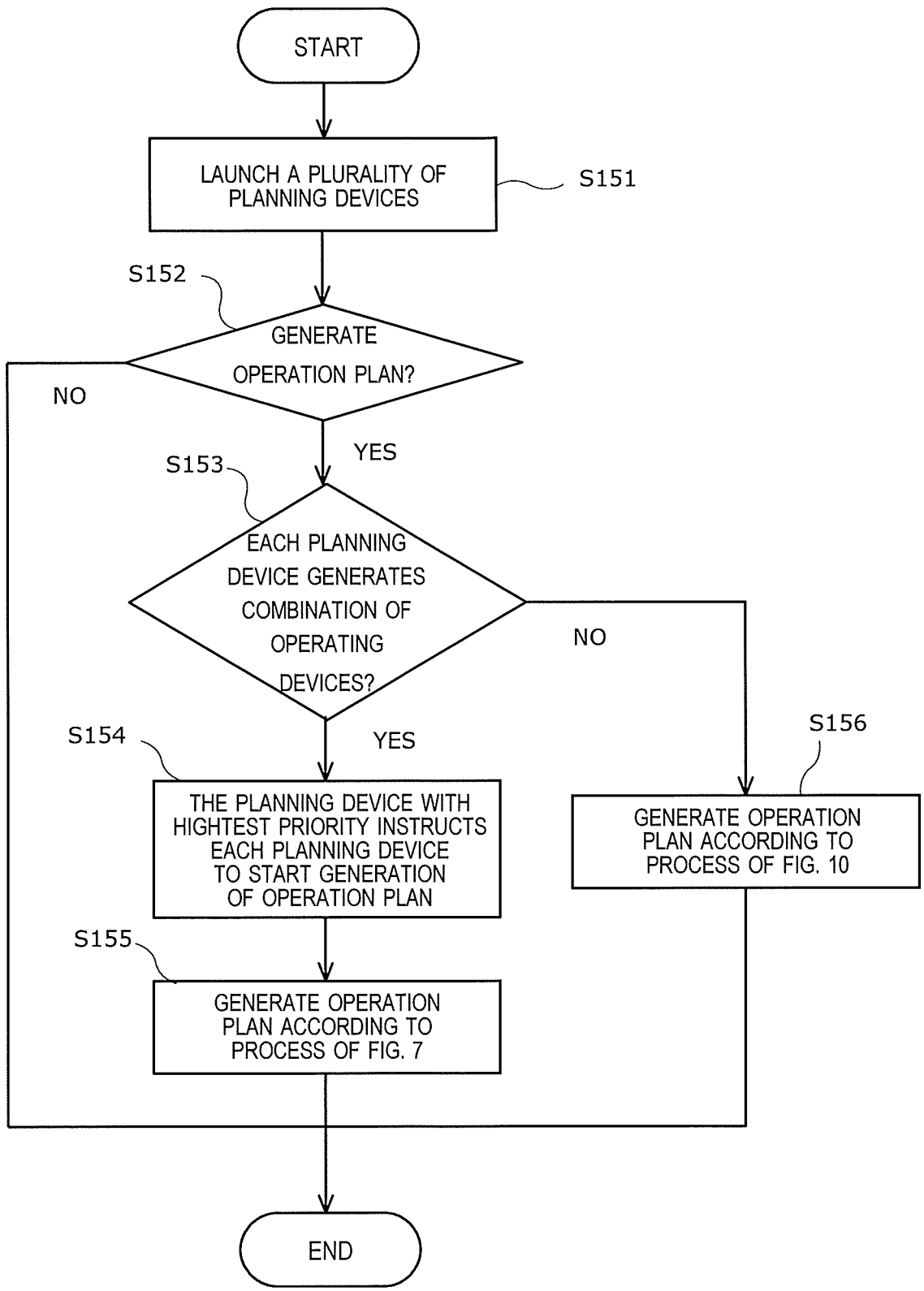
FIG. 14 is a flowchart explaining an example of a process determining the method used for generating the operation plan.

FIG. 14 is a flowchart explaining an example of a process determining the method used for generating the operation plan. In the following, the process is explained with reference to FIG. 14.

First, a plurality of planning devices is launched (step S151). Then, the controller 13 of the planning device with the highest priority determines whether the generation of the operation plan is necessary (step S152). If the operation plan needs to be generated (YES in step S152), it is determined whether each planning device generates the combination of operating devices (step S153). If the generation of operation plans is not necessary, the process of FIG. 14 is finished (NO in step S152).

If each planning device generates the combination of operating devices (YES in step S153), the controller 13 of the planning device with the highest priority transmits instructions to each planning device to start the operation plan generation process (step S154). Each planning device which receives the instruction generates the operation plan according to the method described in FIG. 9 (first embodiment) (step S155).

If each planning device does not generate the combination of operating devices (NO in step S153), the planning device with the highest priority becomes the leader planning device. The leader planning device generates the operation plan according to the method described in FIG. 11 (second embodiment) (step S156).

Information which specifies the method used for generating the operation plan can be stored in the operation plan database 22. Then, the corresponding information can be used in the process of step S153 to determine whether the operation plan is generated according to the method described in FIG. 9 (first embodiment) or the according to the method described in FIG. 11 (second embodiment). Also, the maintenance person can manually specify the method used for generating the operation plan.

Fourth Embodiment

Figure 15:
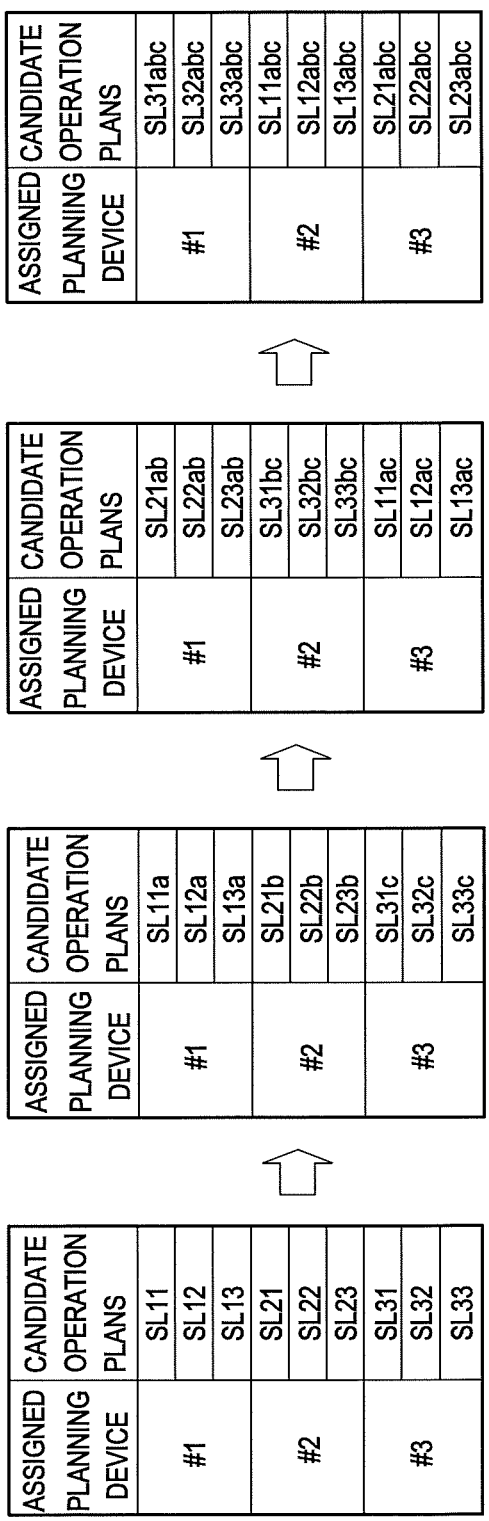
FIG. 15 is a diagram presenting an example of process generating an operation plan according to a fourth embodiment.

To balance the workload of the operation plan generation process across a plurality of planning devices, methods other than the first embodiment and the second embodiment can be used. In the fourth embodiment, the candidate operation plan is shifted across a plurality of planning devices to update the operation plan. FIG. 15 is a diagram presenting an example of process generating an operation plan according to a fourth embodiment. In the following, the process is described with reference to FIG. 15. In FIG. 15, three planning devices including planning devices #1, #2 and #3 are generating the operation plan. The process presented in FIG. 15 is only an example. Therefore, the number of planning devices which generate the operation plan can be different. For example, tens, hundreds, thousands or a greater number of planning devices can execute the process of FIG. 15.

First, planning devices #1 to #3 generate candidate operation plans including combinations of operating devices, the corresponding start-stop patterns, the output setting values and the costs. Planning device #1 generates candidate operation plans SL11, SL12 and SL13. Planning device #2 generates candidate operation plans SL21, SL22 and SL23. Planning device #3 generates candidate operation plans SL31, SL32 and SL33. Each planning device can store the operation plan information corresponding to the candidate operation plans to the operation plan database 22. Also, the operation plan information can be transmitted to other planning devices.

Next, each planning device updates the candidate operation plans (times shifted: 0). If the verifier 14 finds that the candidate operation plan does not satisfy the constraints of the system, the operating devices running in each planning period (start-stop patterns) can be updated to ensure that the constraints of the system are satisfied. Also, the output setting values can be updated to ensure that the constraints of the system are satisfied.

If there are configuration changes or status changes in the operating device which is coupled with each planning device, these changes can be reflected to the candidate operation plan. For example, if the operating device coupled with the planning device fails and the corresponding operating device enters maintenance state, the corresponding operating device can be excluded from the candidate operation plan. If improvements, expansions and addition of features are detected for the operating device coupled with the planning device, the output setting value of the corresponding operating device can be set to a greater value.

By the updating process, the candidate operation plans SL11, SL12 and SL13 generated by the planning device #1 are updated to candidate operation plans SL11$a$, SL12$a$ and SL13$a$, respectively. Also, the candidate operation plans SL21, SL22 and SL23 generated by the planning device #2 are updated to candidate operation plans SL21$b$, SL22$b$ and SL23$b$, respectively. The candidate operation plans SL31, SL32 and SL33 generated by the planning device #2 are updated to candidate operation plans SL31$c$, SL32$c$ and SL33$c$, respectively. Here, the operation plan information corresponding to the updated candidate operation plans can be stored in the operation plan database 22. Also, the operation plan information can be transmitted to other planning devices.

Next, the candidate operation plans which are updated by each planning device are shifted (times shifted:1). The candidate operation plans SL11$a$, SL12$a$ and SL13$a$ are updated by the planning device #3 instead of the planning device #1. The candidate operation plans SL21$b$, SL22$b$ and SL23$b$ are updated by the planning device #1 instead of the planning device #2. The candidate operation plans SL31$c$, SL32$c$ and SL33$c$ are updated by the planning device #2 instead of the planning device #3.

The candidate operation plans SL21$b$, SL22$b$ and SL23$b$ are updated to candidate operation plans SL21$ab$, SL22$ab$ and SL23$ab$, respectively by the planning device #1. Also, the candidate operation plans SL31$c$, SL32$c$ and SL33$c$ are updated to candidate operation plans SL31$bc$, SL32$bc$ and SL33$bc$, respectively by the planning device #2. The candidate operation plans SL11$a$, SL12$a$ and SL13$a$ are updated to candidate operation plans SL11$ac$, SL12$ac$ and SL13$ac$, respectively by the planning device #3. Each planning device calculates the cost for the candidate operation plans. Also, it is confirmed whether the candidate operation plans satisfy the constraints of the system. Each planning device can store the operation plan information corresponding to the candidate operation plans to the operation plan database 22. Also, the operation plan information can be transmitted to other planning devices.

Next, the candidate operation plans which are updated by each planning device are shifted (times shifted:2). The candidate operation plans SL21$ab$, SL22$ab$ and SL23$ab$ are updated by the planning device #3 instead of the planning device #1. The candidate operation plans SL31$bc$, SL32$bc$ and SL33$bc$ are updated by the planning device #1 instead of the planning device #2. The candidate operation plans SL11$ac$, SL12$ac$ and SL13$ac$ are updated by the planning device #2 instead of the planning device #3.

The candidate operation plans SL31*bc*, SL32*bc* and SL33*bc* are updated to candidate operation plans SL31*abc*, SL32*abc* and SL33*abc*, respectively by the planning device #1. Also, the candidate operation plans SL11*ac*, SL12*ac* and SL13*ac* are updated to candidate operation plans SL11*abc*, SL12*abc* and SL13*abc*, respectively by the planning device #2. The candidate operation plans SL21*ab*, SL22*ab* and SL23*ab* are updated to candidate operation plans SL21*abc*, SL22*abc* and SL23*abc*, respectively by the planning device #3. Each planning device calculates the cost for the candidate operation plans. Also, it is confirmed whether the candidate operation plans satisfy the constraints of the system. Each planning device can store the operation plan information corresponding to the candidate operation plans to the operation plan database 22. Also, the operation plan information can be transmitted to other planning devices.

After each planning device updates the candidate operation plans, each planning device confirms whether any of the candidate operation plans are satisfying the constraints of the system. If any of the planning devices finds candidate operation plans which satisfy the constraints of the system, each planning device can finish the operation plan generation process. However, similar to the first embodiment, other conditions can be used to finish the process. For example, the process can be finished if the number of candidate operation plans which satisfy the constraints of the system exceeds the threshold value.

In above, a case when the operation plan generation process was executed was described as an example. However, the method described in the embodiment can be applied to cases when the operation plan updating processes of existing operation plans are executed. The candidate operation plans are shifted across planning devices in FIG. 15. If the number of shifts exceeds a certain value, the candidate operation plans would circulate across a plurality of planning devices. However, the shifting pattern presented in FIG. 15 is only an example. Therefore, the operation plans can be shifted in a different direction. Also, the order of the shifting can be different from FIG. 15.

By applying the method of the embodiment, the workload can be balanced across the plurality of planning devices. Also, configuration changes or status changes in the operating device which is coupled with each planning device can be reflected to the candidate operation plan within a short period. In some cases, the information of the device database 21 of the management server 3 may be updated with a certain delay after the detection of changes. However, by utilizing information of the operating devices which are local to each planning device, the generation process and updating process of the operation plan can be executed efficiently.

Fifth Embodiment

In the operation planning systems of the above embodiments, the process was executed in the order of: generation of combinations of operating devices; generation of start-stop patterns by using the combinations of operating devices; determining the output setting values in the start-stop patterns; calculation of costs; and checking whether the constraints of the system are satisfied. However, the operation planning process does not necessary have to be executed in the above order. Also, the operation planning process does not have to include all of the above processes.

For example, the process of determining the output setting values can be executed immediately after the generation of combinations of operating devices. In this case, the process of generating the start-stop pattern is being skipped. In this case, an operation plan with the same combination of operating devices running continuously thorough all of the planning periods is generated. The launching operations and the stopping operations of the operating devices may require costs. Therefore, operation plans with minimum numbers of launching and stopping operations for operating devices between the planning periods may be more cost-efficient. In the fifth embodiment, the process of generating the start-stop pattern is being skipped.

Figure 16:
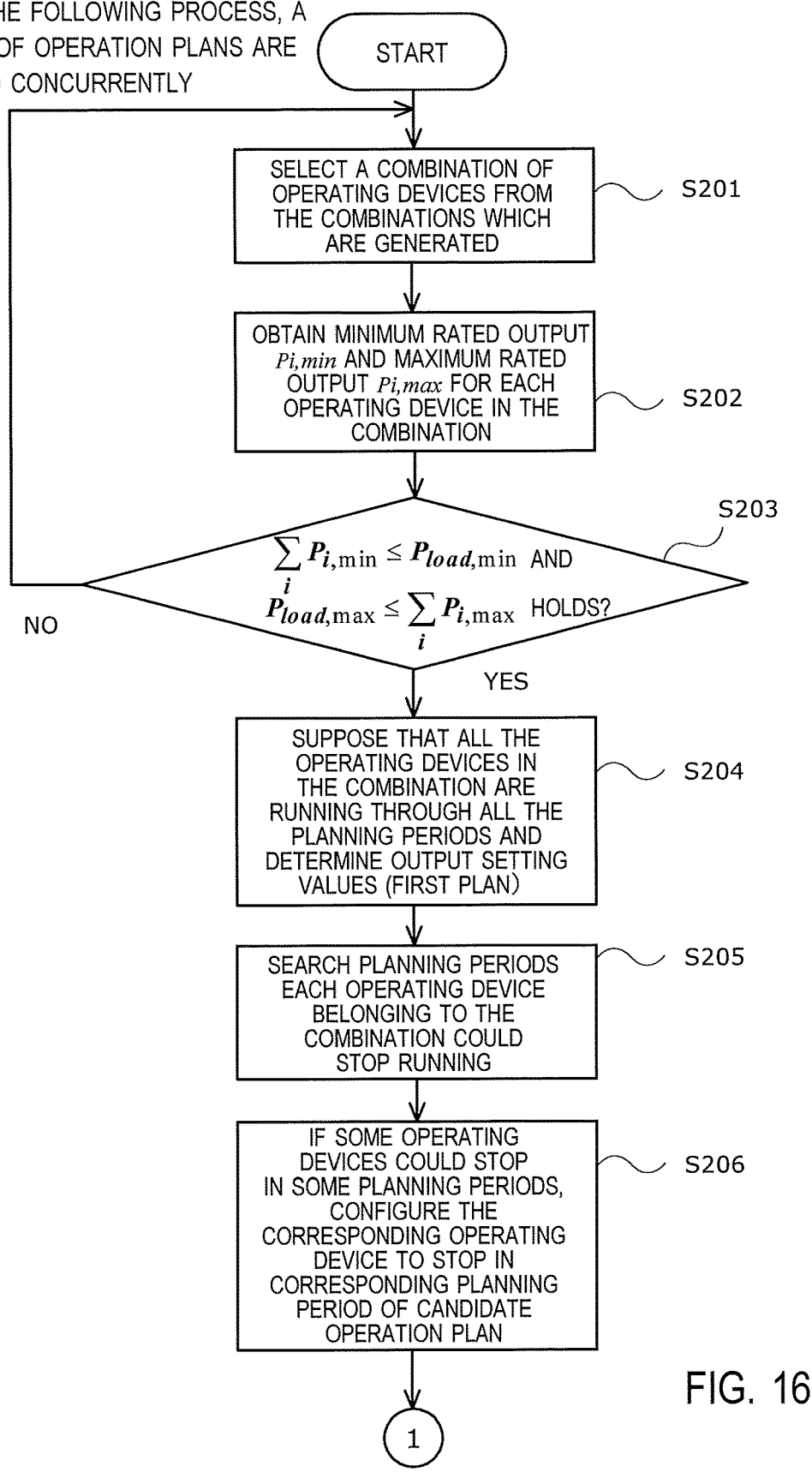
FIG. 16 is a flowchart explaining an example of process generating an operation plan according to a fifth embodiment.
Figure 17:
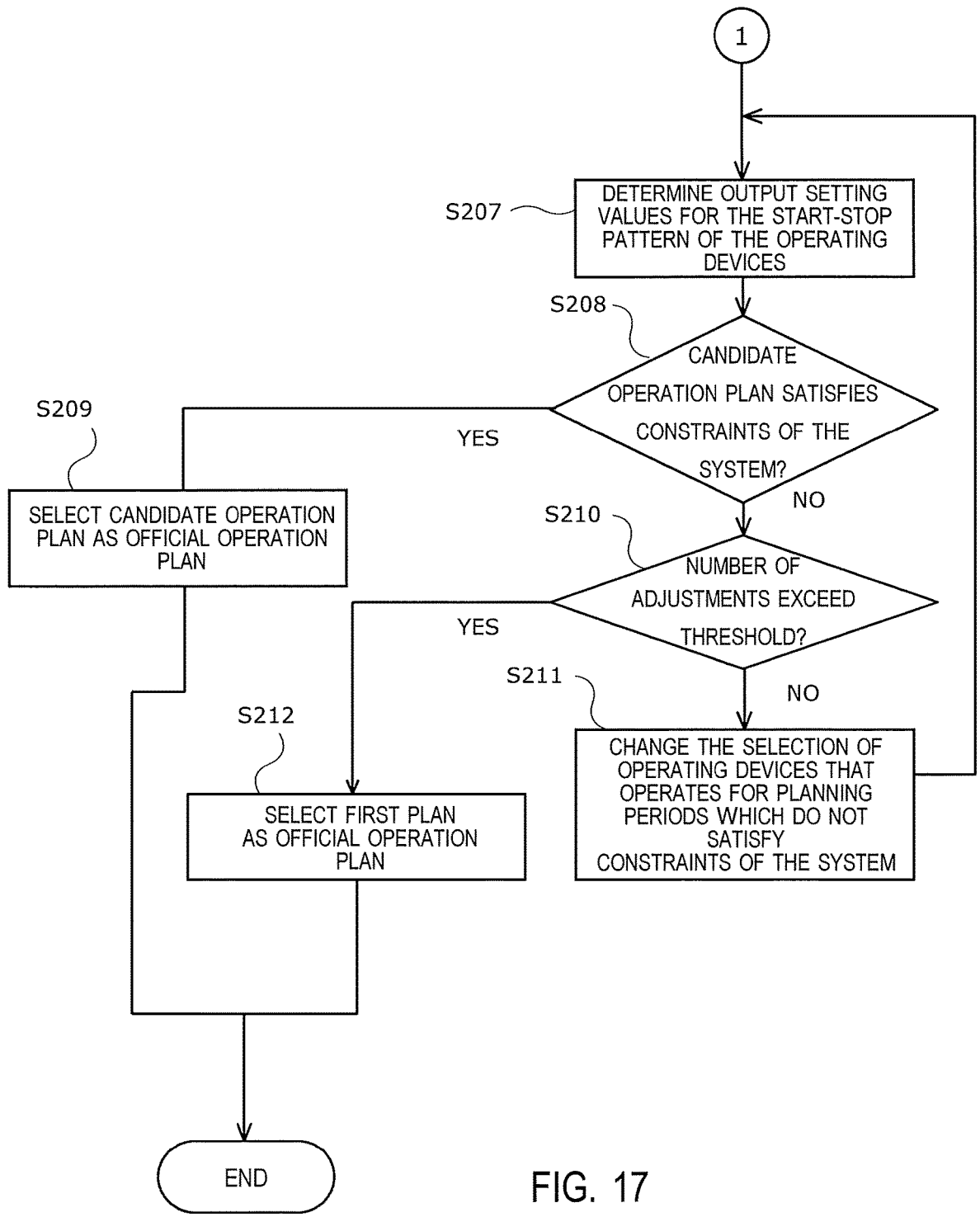
FIG. 17 is a flowchart explaining an example of process generating an operation plan according to the fifth embodiment.

FIG. 16 and FIG. 17 are flowcharts explaining an example of process generating an operation plan according to a fifth embodiment. In the following, the process is described with reference to FIG. 16 and FIG. 17. Before the process of FIG. 16 and FIG. 17 is executed, the process of generating the combination of operating devices (for example, the process of FIG. 6) is executed.

By having the process of FIG. 16 and FIG. 17 executed by a plurality of planning devices, a plurality of operation plans is generated concurrently. If a plurality of operation plans which satisfy the constraints of the system are generated, the operation plan with the lowest cost can be selected as the official operation plan. Generally, the greater the number of planning devices executing the process becomes, the greater the possibility a cost-efficient operation plan is generated within a short period of time.

First, the planning device selects at least either of the combinations of operating devices stored in the operation plan database 22 (shared storage space) (step S201). The planning device can mark (record) that the combination of the operating devices is selected in the data corresponding to the selected combination of operating device (first data). Here, the data is stored in the operation plan database. In this case, each planning device can confirm whether the first data is being marked. Thereby, each planning device can select the combination of operating devices which is not selected (not marked) by other planning devices. In other words, the combination of operating devices selected by each planning device can be unique. Thus, selection of the same combination by a plurality of planning devices could be avoided.

By having each planning device generate candidate operation plans by using different combinations of operating devices, the overlaps in the searched space for each of the planning devices can be prevented. Therefore, it becomes easier to find a cost-efficient operation plan with the desired characteristics.

Next, each planning device obtains information of the minimum rated output and the maximum rated output of each operating device included in the combination (step S202). Then, based on the total output required of each planning period, the minimum rated output of each operating device and the maximum rated output of each operating device, it is confirmed whether the conditions of equation (3) and equation (4) are satisfied (step S203). If the conditions of equation (3) and equation (4) are not satisfied (NO in step S203), the process returns to step S201. In step S201, other combinations of operating devices are selected.

If the conditions of equation (3) and equation (4) are satisfied (YES in step S203), the process of determining the output setting values is executed, supposing that all the operating devices in the combination continue to operate through all the planning periods (step S204). Details of the process for determining output setting values are described in the description of FIG. 10 mentioned above. The plan generated in step S204 is called the first plan. The first plan is an example of an operation plan generated by skipping the process of generating the start-stop pattern. The operation plan information corresponding to the generated first plan is stored in the operation plan database 22 (shared storage space).

In the process of FIG. 16 and FIG. 17, the operation plan including the launching operations and the stopping operations of operating devices is generated, as well. The following steps correspond to the process of generating the operation plan including the launching operations and the stopping operations of operating devices.

By using the same combination of operating devices as the combination used for generating the first plan, the planning periods each operating device could stop is searched (step S205). If any of the operating devices could be stopped in some of the planning periods, the corresponding operating device is configured to stop in some of the planning periods (step S206). Therefore, in steps S205 and S206, the start-stop patterns of the operating devices are determined. Details of the process executed in step S205 and step S206 are mentioned in the description of FIG. 8.

In the following, the process is described with reference to FIG. 17.

Next, the output setting values of the start-stop pattern of the operating devices are determined (step S207). Details of the process of determining the output setting values are mentioned in the description of FIG. 10. Next, it is confirmed whether the candidate operation plans which are being generated satisfies the constraints of the system (step S208). If the candidate operation plan is satisfying the constraints of the system (YES in step S208), the corresponding candidate operation plan is selected as the official operation plan (step S209).

If the candidate operation plan does not satisfy the constraints of the system (NO in step S208), it is confirmed whether the number of updates is exceeding threshold (step S210). If the number of updates is exceeding the threshold (YES in step S210), the first plan is selected as the official operation plan (step S212). If the number of updates is not exceeding the threshold (NO in step S210), the selection of operating devices which operates is changed for the planning periods the constraints of the system are not satisfied (step S211). Therefore, in step S211, the start-stop patterns of operating devices can be updated. Then, the output setting values for the updated start-stop pattern are determined (step S207).

As mentioned above, the update of the start-stop patterns and the output setting values are repeated until a candidate operation plan satisfying the constraints of the system is available or the number of updates exceeds the threshold. If a candidate operation plan satisfying the constraints of the system becomes available after updates equal to or less than the threshold value, the corresponding candidate operation plan is selected as the official operation plan. If a candidate operation plan satisfying the constraints of the system is not available after number of updates greater than the threshold value, the first plan with the same combination of operating devices operating through all the planning periods is selected as the official operation plan.

The process of FIG. 16 and FIG. 17 is only an example. For example, the cost of the first plan and the operation plan including the start-stop pattern can be compared. Then, the plan with the lower cost can be selected as the official operation plan. Also, operation planning system can generate only the first plans while not generating the operation plan including the start-stop patterns.

FIG. 18 is a diagram presenting an example of data generated in the operation plan generation process according to the fifth embodiment. FIG. 18 is an example when the first plan is generated by using COMBINATION: 510 (DEVICE_ID=F, G, I, H, C, D, E and B) of the operating devices. This combination is same as the combination used in the examples of FIG. 5 to FIG. 8.

Table 35 of FIG. 18 presents a combination of operating devices (COMBINATION: 510). Referring to table 46, the operating devices with DEVICE_ID=F, G, H, C, D, E and B are configured to continue to operate through the planning periods j=1 to 24. Table 51 is an example of a first plan generated by using the configuration of table 46.

Sixth Embodiment

In the sixth embodiment, an example when a plurality of planning device generates operation plans by using genetic algorithms is described. As described above, the greater the number of planning devices which execute the operation plan generation process becomes, the greater the possibility that a cost-efficient operation plan can be generated in a shorter period of time. In the sixth embodiment, each planning device uses different combinations of operating devices to generate candidate operation plans. Therefore, the generation of the same candidate operation plan by plurality of planning devices can be avoided.

Figure 19:
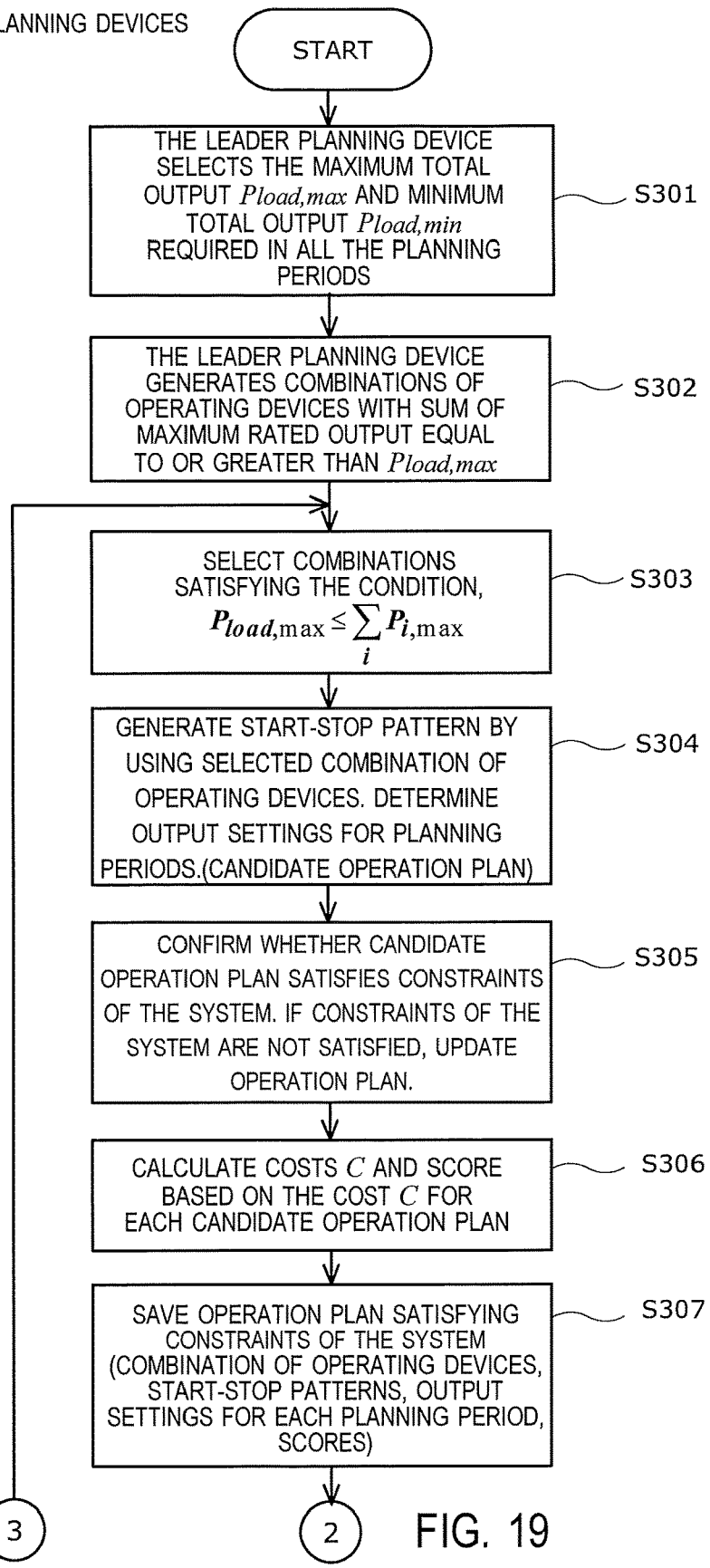
FIG. 19 is a flowchart explaining an example of process generating an operation plan according to a sixth embodiment.
Figure 20:
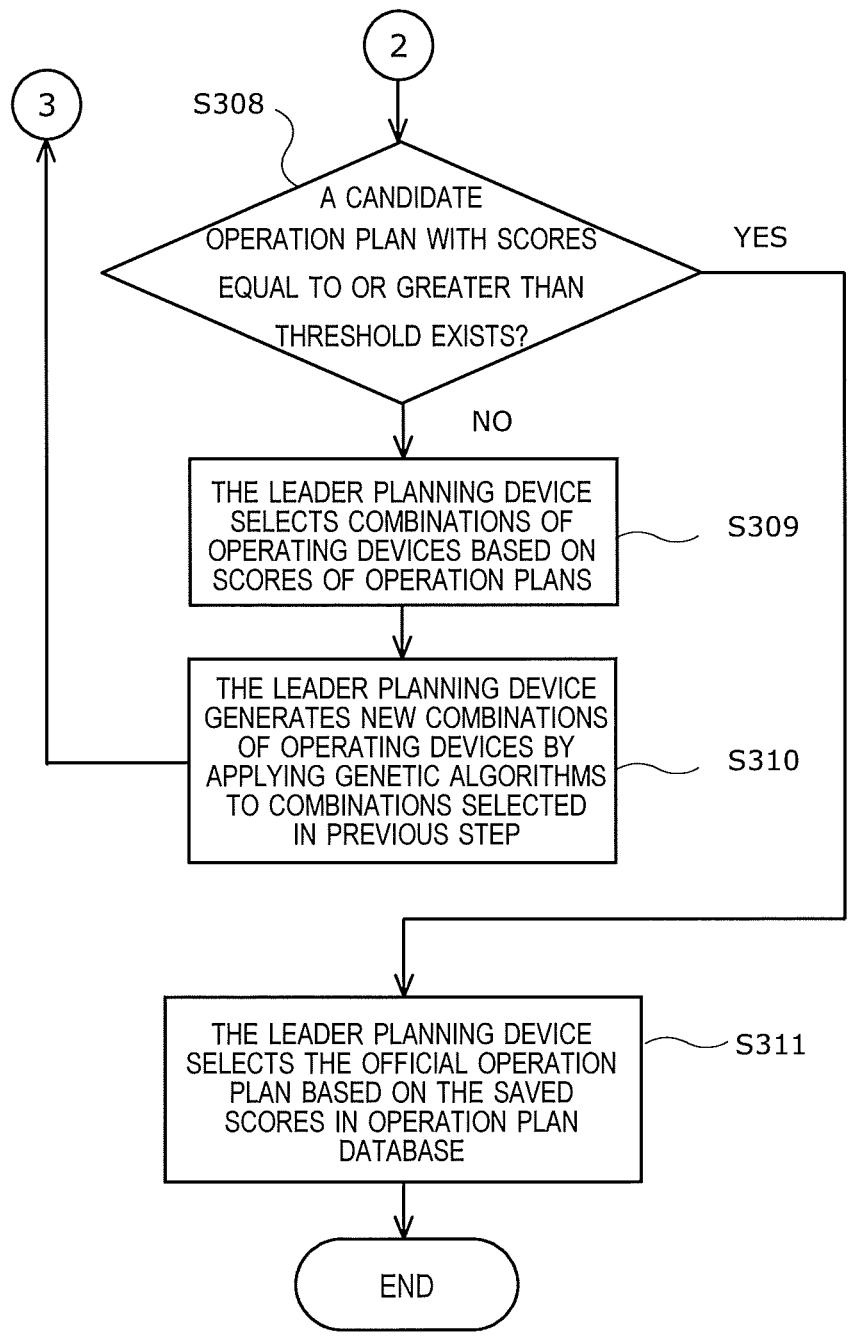
FIG. 20 is a flowchart explaining an example of process generating an operation plan according to the sixth embodiment.

FIG. 19 is a flowchart explaining an example of process generating an operation plan according to a sixth embodiment. In the following, the process is explained with reference to FIG. 19.

In the following, the planning device with the authority to generate combinations of operating devices is called the leader planning device.

First, the leader planning device obtains the maximum value of total output $P_{load,max}$ required in all the planning periods and the minimum value of total output $P_{load,min}$ required in all the planning periods (step S301). Then, the leader planning device generates a plurality of combinations of operating devices with the sum of maximum rated output equal to or greater than $P_{load,max}$. The leader planning device saves the generated combinations of the operating devices to the operation plan database 22 (shared storage space) (step S302). The leader planning device can be determined based on the priorities of the planning devices stored in the device database 21, for example. However, the leader planning device can be determined by using other methods.

The processes of steps S303 to S306 are executed by a plurality of planning devices. Here, the plurality of planning devices which generates the processes of steps S303 to S306 can include the leader planning device. Also, the leader planning device can be excluded from the plurality of planning devices which generates the processes of steps S303 to S306.

Next, each planning device selects a combination of operating devices which satisfies the condition of equation (4) from the generated combination of operating devices (step S303). Each planning device can mark (record) that the combination of the operating devices is selected in the data corresponding to the combination of operating device (first data). Then, each planning device can confirm whether the first data is being marked. Thereby, each planning device can select the combination of operating devices which is not selected (marked) by other planning devices. In other words, the combination of operating devices selected by each planning device can be unique. Thus, selection of the same combination by a plurality of planning devices could be avoided.

Then, each planning device generates a start-stop pattern of operating devices by using the selected combination of operating devices. Also, each planning device determines the output setting values for the start-stop patterns (step S304). The data including the combinations of operating devices, the start-stop patterns and the output setting values generated by each planning device in steps S303 and S304 correspond to the candidate operation plans.

Next, each planning device confirms whether the candidate operation plans are satisfying the constraints of the system. If the constraints of the system are not satisfied, the candidate operation plans are amended (step S305). During the updating process of the candidate operation plan, the start-stop patterns can be changed. Also, during the updating process of the candidate operation plan, the output setting values can be changed. The combination of above can be executed during the updating process of the candidate operation plan. Then, the costs of each candidate operation plan and the scores based on the costs are calculated (step S306).

The scores are values used for evaluating candidate operation plans. The scores can be set to greater values if the candidate operation plan has desired characteristics. Examples of desired characteristics include economic factors, environmental factors and stability of output. The scores can be calculated by multiplying a coefficient to the inverse number of the costs. Also, the value of the fitness function can be used as the score. The scores can be calculated by using any method. Factors such as the amount of generated pollutants, emission of greenhouse-effect gases and environmental loads can be included in the calculation of the scores.

Then, each planning device stores the combinations of operating devices, start-stop patterns, output setting values and the corresponding scores, for the candidate operation plan which satisfies the constraints of the system to the operation plan database 22 (shared storage space) (step S307). Next, the leader planning device accesses the operation plan database 22 to confirm whether there are candidate operation plans with scores equal to or greater than the threshold value (step S308).

If candidate operation plans with scores equal to or greater than the threshold value exist (YES in step S308), the leader planning device selects the official operation plan based on the scores stored in the operation plan database 22 (step S311). In step S311, the candidate operation plan with the largest score is selected as the official operation plan.

If there are no candidate operation plans with scores equal to or greater than the threshold value (NO in step S308), the leader planning device selects a plurality of combinations of operating devices based on the scores in the operation plan information (step S309). In step S309, the combinations of operating devices are extracted from candidate operation plans with the highest scores. For example, the combination of operating devices can be selected from the candidate operation plans with the top 50 scores. Also, the combination of operating devices can be selected from the candidate operation plans within the top 10 percentile of scores. The combination of operating devices can be selected by using any other criteria.

Then, the leader planning device generates new combinations of operating devices by applying genetic algorithms to combinations selected in the previous step (step S310). The leader planning device stores the new combinations of operating devices generated by genetic algorithms to the operation plan database 22 (shared storage space). After the execution of step S310, the process of step S303 and the later steps are executed again.

Figure 22:
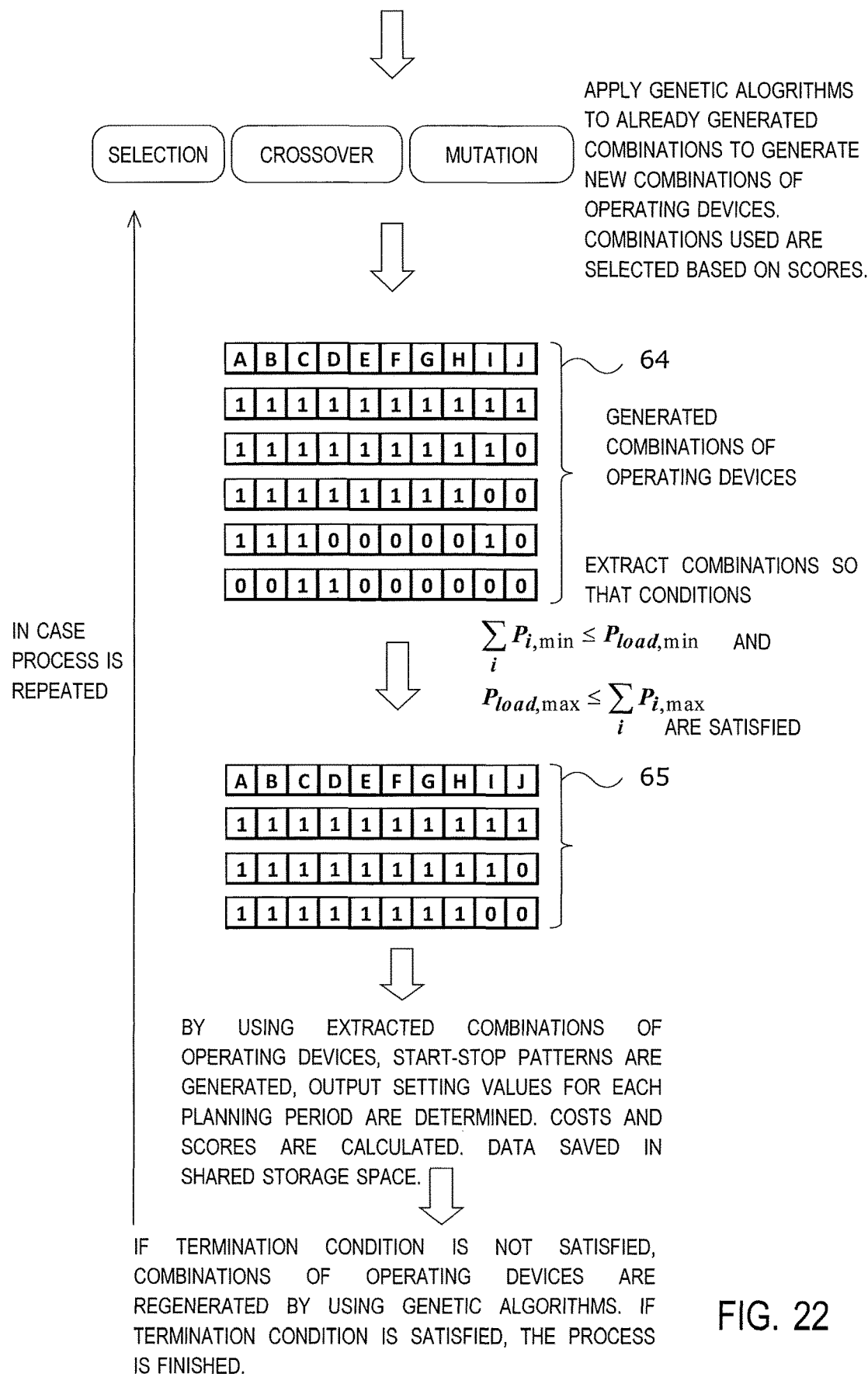
FIG. 22 is a diagram presenting an example of data generated in the operation plan generation process according to the sixth embodiment.

FIG. 21 and FIG. 22 provide an overview of the process described in FIG. 19. In FIG. 21, six combinations of operating devices generated by the leader planning device is presented (table 62). After conformity to the conditions of equation (3) and equation 84) are checked, four combinations of operating devices are selected (table 63).

As shown in the top of FIG. 22, operations of the genetic algorithms include selections, crossovers and mutations. Either of the operations can be used to generate different combinations of operating devices. Also, a combination of different types of operations can be used. By applying the genetic algorithms, five new combinations of the operating devices are generated (table 64 of FIG. 22).

Then, regarding the combinations of operating devices in table 64, conformity to the conditions of equations (3) and (4) are checked. By the checking process, it is found that three combinations of operating devices shown in table 65 satisfy the conditions. Thus, the combinations of operating devices in table 65 of FIG. 22 are selected.

Seventh Embodiment

In the operation planning system according to the first embodiment, databases including the demand database 20, the device database 21, the operation plan database 22 were saved in the storage 19 of the management server 3. However, the locations of the databases in the first embodiment were only examples. Therefore, the databases can be located in storage spaces provided by other components and devices. In the operation planning system according to the seventh embodiment, the databases are located in the local storage of the planning devices.

Figure 23:
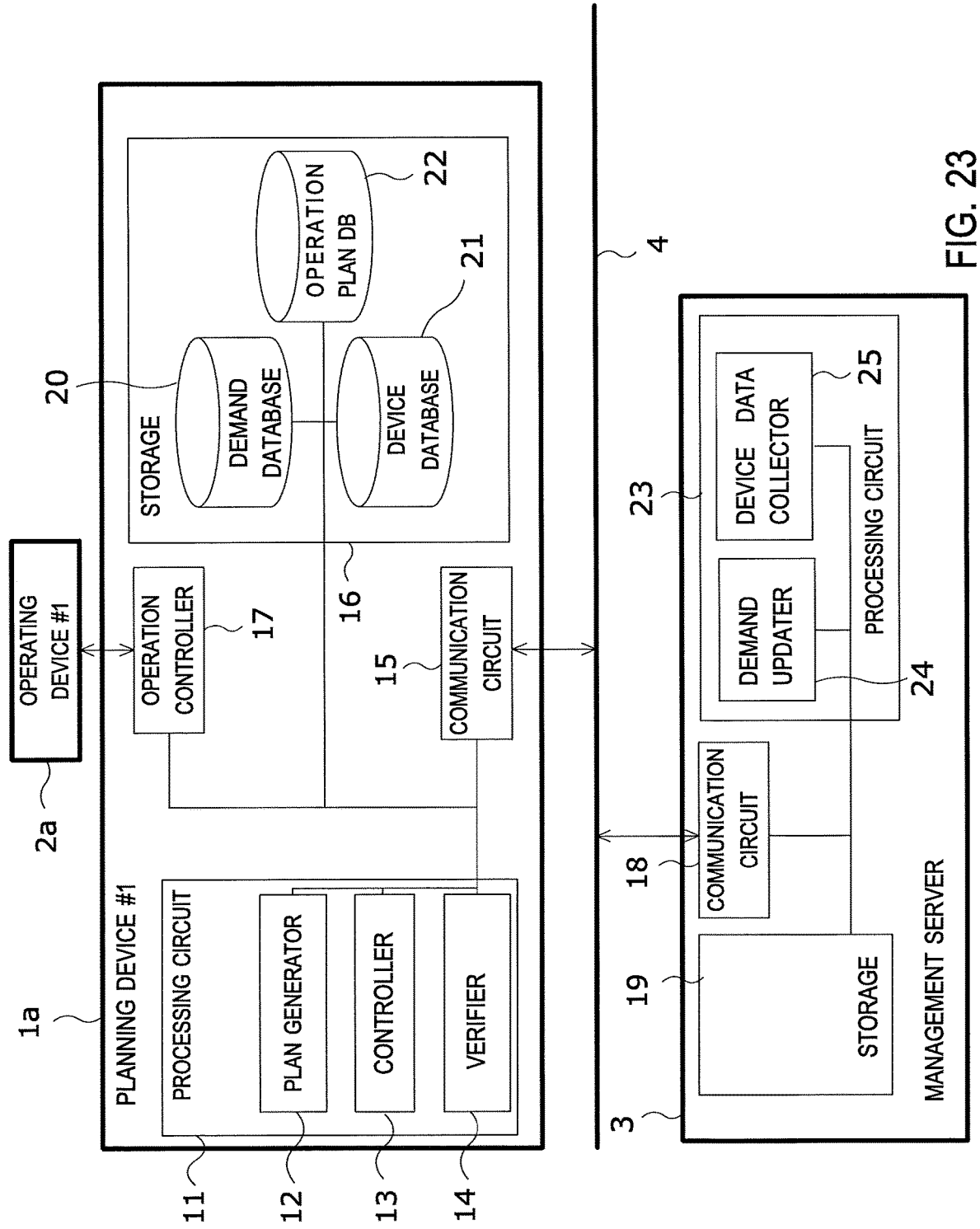
FIG. 23 is a diagram illustrating a configuration example of an planning device according to a seventh embodiment.

FIG. 23 is a diagram illustrating a configuration example of a planning device according to the seventh embodiment. In the example of FIG. 23, the demand database 20, the device database 21 and the operation plan database 22 are saved in the storage 16 of the planning device 1a (planning device #1). In the following the storage 16 is called the local storage. The local storage of the planning device can include storage space which is accessible from other planning devices. Also, the local storage of the planning device may not be accessible from other planning devices. The operation plan database 22 can be saved in storage space which is accessible from other planning devices. Part of the storage space provided by the local storage of the planning device may not be accessible from other planning devices. Also, only some of the planning devices can have the demand database 20, the device database 21 and the operation plan database 22 saved in the local storage. Also, the above databases can be saved in the local storages of all the planning devices.

If the demand database 20, the device database 21 and the operation plan database 22 are saved in the local storages of plurality of planning devices, the instructions for updating data can be broadcasted to the plurality of planning devices. Thus, each planning device can access the same data content by referring to the local storage. For example, if a planning device generates a combination of operating devices or generates a candidate operation plan, the corresponding planning device broadcasts instructions for updating the operation plan information to the plurality of planning devices. Each planning device which receives the instruction updates the operation plan information stored in the operation plan database 22 of the local storage.

Either of the planning devices or the management server can broadcast the instructions for updating of database to the plurality of planning devices. The above instructions can be broadcasted when configuration changes or status changes of the planning device or the operating device are detected.

The above instructions can be broadcasted when the total output required in a planning period is changed. Thus, each planning device can generate operation plans by using the same data content, despite the fact each planning device is referring to the local storage.

If the demand database 20, the device database 21 and the operation plan database 22 are located in a plurality of planning devices, the database located in the local storage of either of the planning devices can be configured as the master database. Then, if the value of the total output required in a planning period is changed, the demand database 20 in the master database is updated first. Then, the demand databases 20 of the other planning devices are updated. If configuration changes or status changes of the planning devices or operating devices are detected, the device database 21 in the master database is updated first. Then, the device databases 21 of the other planning devices are updated.

If file system errors or storage device errors are detected in either of the planning devices, the recovery of the databases may become necessary. In such cases, the database can be recovered based on the data stored in the master database. Also, the database can be recovered by using the transaction log. The transaction log can be saved in any of the devices.

As shown in the configuration of FIG. 23, the local storage of each planning device can store data required for generating the operation plans. In such configurations, the planning devices do not have to access the management server in the steps of the operation plan generation process and the operation plan updating process. Thereby, it is possible to reduce the overall workload of the management server. Also, the operation plan generation process and the operation plan updating process can be continued even when the management server is down. The operation plan generation process and the operation plan updating process can be continued even when part of the network between the management server and the planning devices are failing.

The locations of the databases in the operation planning system can be different from the examples of FIG. 2 and FIG. 23. For example, at least parts of the demand database 20, the device database 21 and the operation plan database 22 can be located in external storages or storages in the cloud. As long as the operation plan database 22 are accessible from the plurality of planning devices, the location of the databases and the implementation of the operation planning system are not limited.

Therefore, each planning device transmits the operation plan information of the generated operation plan (candidate operation plan) via the communication circuit 15. The transmitted operation plan information is saved in at least the storage space which is accessible from other planning devices (shared storage space) or the storage space provided by the local storage in each planning device. Thus, the plurality of planning devices can access the data of operation plans (operation plan information) generated by other planning devices to generate new operation plans.

Eighth Embodiment

In the eighth embodiment, the hardware configurations of the planning devices, the management server and parts of the operating devices are described. For example, the planning devices, the management server and parts of the operating devices can be implemented by using a computer 100.

Examples of the computer 100 include various information processing devices including servers, client devices, microprocessors of embedded devices, tablets, smartphones, feature phones and personal computers. The computer 100 may be implemented by VMs (virtual machines) or containers.

Figure 24:
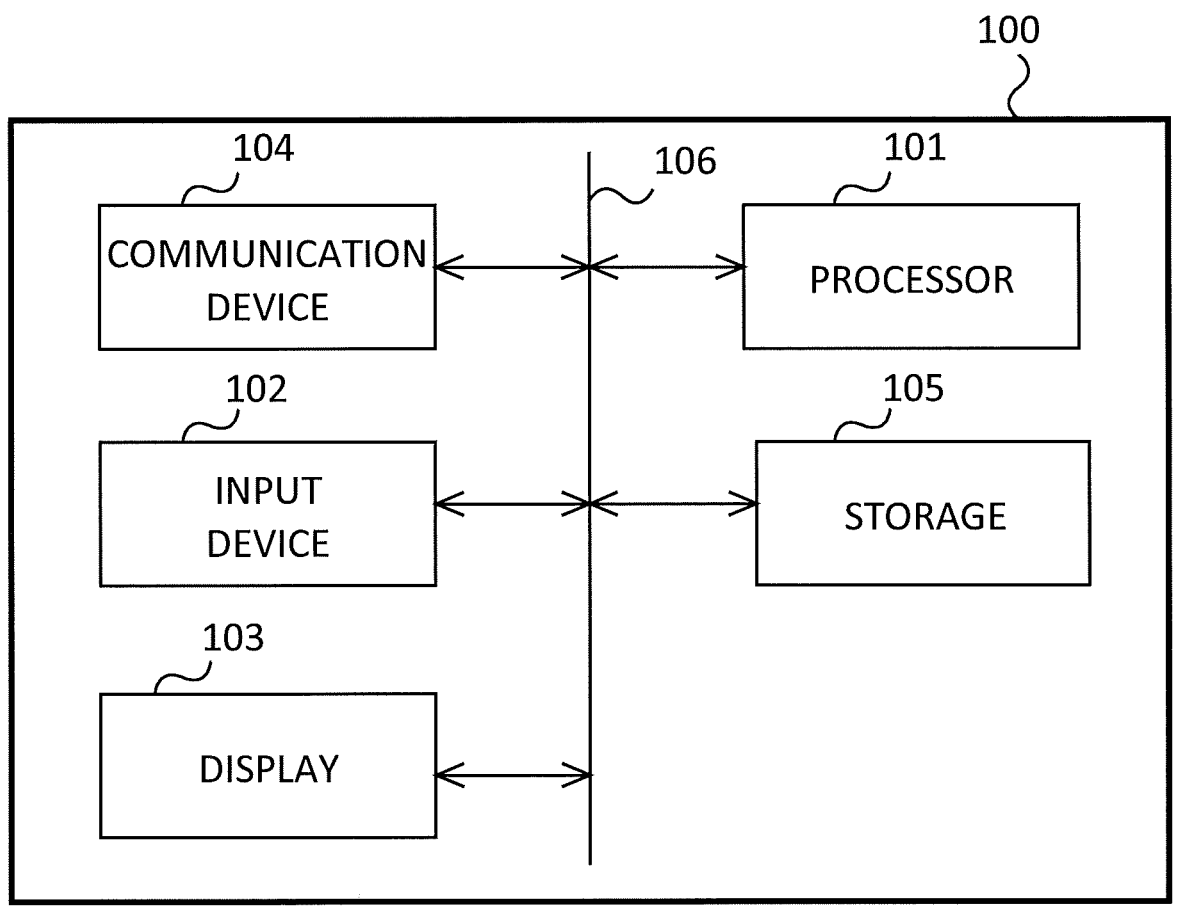
FIG. 24 is a diagram illustrating a configuration example of an planning device according to an eighth embodiment.

FIG. 24 is a diagram showing hardware configuration of the information processing device. The computer 100 in FIG. 24 includes a processor 101, an input device 102, a display 103, a communication device 104 and a storage 105. The processor 101, the input device 102, the display 103, the communication device 104 and the storage 105 are connected to each other by a bus 106.

The processor 101 is an electric circuit including the controller and arithmetic unit of the computer 100. It is possible to use general purpose processors, central processing units (CPUs), microprocessors, digital signal processors, controllers, microcontrollers, state-machines, ASICs, FPGAs, PLDs or a combination of the above as the processor 101.

The processor 101 executes arithmetic operations by using data or programs provided from devices connected via the bus 106 (for example, the input device 102, the communication device 104 and the storage 105). Also, the processor 101 transmits the calculated results and control signals to the devices connected via the bus 106 (for example, the display 103, the communication device 104 and the storage 105). Specifically, the processor 101 executes the OS (the operation system) of the computer 100 and operation planning programs. Also, the processor controls various devices which are included in the computer 100.

The operation planning program is a program which makes the computer 100 execute the processes of each component in the operation planning system. The operation planning program is stored in non-transitory storage medium which is readable by the computer. Examples of the storage medium include optical discs, magnetic discs, magnetic tapes, flash memories and semiconductor memory. However, the type of storage medium is not limited. When the processor 101 executes the operation planning program, the computer 100 can operate as the planning device or the operating device or the management server.

The input device 102 is a device which can be used for entering information to the computer 100. Examples of the input device 102 include a keyboard, a mouse and a touch panel. However, the type of device is not limited. By using the input device 102, the users can select the type of operation plan generation process which is going to be executed. Also, the users can select the method which is used to generate the combinations of operating devices by using the input device 102. The users can change the value of the required output by using the input device 102. The users can enter the instruction to: start the operation plan generation process; start the operation plan updating process; refer to the contents of various databases; and edit the contents of various databases by using the input device 102.

The display 103 can display graphics and videos. Examples of the display 103 include a LCD (liquid crystal display), CRT (cathode ray tube) or an organic electroluminescence display. However, the type of displays used is not limited. Examples of the contents presented on the display 103 include: information of the currently applied operation plan; information of the currently generated candidate operation plan; details of the operation plan information; configurations and states of each planning device; and configurations and states of each operating device.

The communication device 104 enables the computer 100 to communicate with external devices via wireless or wired communication mediums. Examples of the communication device 104 include Network Interface Cards, communication modules, hubs and routers. However, the type of device is not limited. The computer 100 may collect data from other planning devices, the management server and the operating device via the communication device 104. Also, if the computer 100 is a server installed in data centers and machine rooms, the computer 100 may accept instructions transmitted from remote communication terminals and transmit contents which are displayed in remote communication terminals, via the communication device 104.

The storage 105 saves the operating system of the computer 100, the operation planning program, data necessary to execute the operation planning program and data generated by the operation planning program. The storage 105 includes the main storage device and the external storage device. Examples of the main storage device include DRAM and SRAM. However, the type of device used as the main storage device is not limited. Also, examples of the external storage device include HDD, optical discs, flash memory and magnetic tapes. However, the type of device used as the external storage is not limited. The aforementioned demand database 20, device database 21, and operation plan database 22 can be configured on the storage 105. The above databases may be configured on external servers or external storage.

The computer 100 may include a plurality of processors 101, input devices 102, displays 103, communication devices 104 and storage 105. The computer 100 may be connected to peripheral devices such as printers or scanners.

The planning device, part of the operating device and the management server can each be configured with a single computer 100. The planning device, part of the operating device and the management server can each be configured with a plurality of computers which are connected to each other.

The operation planning program may be stored in the storage 105 of the computer 100. The operation planning program may be stored in the external storage. The operation planning program may be uploaded to the internet. By installing the operation planning program to the computer 100, the features of the planning device, the operating device and the management server become executable.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the devices mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An operation planning system comprising:
a hardware storage configured to:
store information of a plurality of operating devices; and
store a total output required for the plurality of operating devices in a planning period;
a plurality of planning devices corresponding to the operating devices and each implemented by processing circuitry,
each of the plurality of planning devices configured to:
generate a combination of operating devices configured to output the total output required in the planning period;
determine an output setting value for each of the operating devices belonging to the combination based on the total output: and
generate an operation plan for the planning period the operation plan including the combination and the output setting value for each of the operating devices in the combination;
wherein the planning devices each receive combination data which is data of the combinations generated by the other planning devices being part of the planning devices; and generate an operation plan different from operation plans generated by the other planning devices based on the combination data generated by the other planning devices, and
the planning devices select an operation plan which is actually used for operation of the plurality of operating devices from the operation plans generated by the planning devices.

2. The operation planning system according to claim 1, wherein
the plurality of planning devices are configured to generate the operation plan based on the combination data including unique combinations which are different from the combinations used by the other planning devices.

3. The operation planning system according to claim 1, wherein
the plurality of planning devices are configured to generate the combination of the operating devices based on the combination data.

4. The operation planning system according to claim 3, wherein
the plurality of planning devices are configured to generate the combination of operating devices by applying either genetic algorithms, reinforcement learning or particle swarm optimization to the combination data.

5. The operation planning system according to claim 1, wherein
either of the plurality of planning devices is configured to: generate a plurality of the combinations of the operating devices; determine assignments of the combinations each of the planning devices uses to generate the operation plan; and notifies the assignments to the plurality of planning devices.

6. The operation planning system according to claim 1, wherein
either of the plurality of planning devices is configured to: generate a plurality of the combinations of operating devices; and store first data which is data of the generated combinations to a storage space in the storage which is accessible from the other planning devices, and
the plurality of planning devices are configured to: select the combination used for generating the operation plan by accessing the first data; and mark the first data corresponding to the selected combination to ensure that selection of the combination is avoided by the other planning devices.

7. The operation planning system according to claim 1, wherein
the operation plan includes a plurality of planning periods, and
the plurality of planning devices are configured to: generate a start-stop pattern of the operating devices by using the combination; and determine the output setting values of the operating devices which operate in each of the planning periods, according to the start-stop pattern.

8. The operation planning system according to claim 7, wherein
the plurality of planning devices are configured to: calculate average operation costs of the plurality of operating devices; calculate priority values based on the average operation costs; select the combination based on the priority values; and generate the start-stop pattern by searching the platting periods the operating devices in the combination could stop by using minimum operation times and minimum downtimes of the operating devices.

9. The operation planning system according to claim 8, wherein
the plurality of planning devices are configured to select the operating device which continues to operate through a plurality of the planning periods based on at least either maximum rated output, difference between the maximum rated output and the minimum rated output, the average operation cost, start-up cost or shutdown cost.

10. The operation planning system according to claim 1, wherein
the plurality of planning devices are configured to select an operation plan which is actually used for operation of the plurality of operating devices from a plurality of the operation plans based on at least either satisfaction of constraints imposed on the operation planning system, values of costs or values of scores.

11. The operation planning system according to claim 1, wherein
the plurality of operating devices are a plurality of power generators, and the total output is the electric power required for the plurality of the power generators.

12. An operation planning method for an operation plan with a plurality of planning periods, executed by a plurality of planning devices, comprising
generating, by at least either of the planning devices, combinations of operating devices configured to output total outputs required in the plurality of planning periods;
obtaining, by the planning devices combination data which is data of the combinations generated by at least one other planning device including the at least one of the planning; devices;
generating, by the planning devices, start-stop patterns of the operating devices in the plurality of planning periods based on combinations of operating devices different from the combinations indicated by the combination data;
determining, by the plurality of planning devices, output setting values for the operating devices which operate in each of the planning periods, according to the start-stop patterns:
generating, by the plurality of planning devices, the operating plans, the operation plans each including the combination and the output setting value for each of the operating devices in the combination; and
selecting, by the plurality of planning devices, an operation plan which is actually used for operation of the plurality of operating devices from the operation plans generated by the plurality of planning devices.

13. The operation planning method according to claim 12, further comprising:
generating, by each of the plurality of planning devices, the combination of operating devices different from the combinations indicated by the combination data by applying either genetic algorithms, reinforcement learning or particle swarm optimization to the combination data.

14. The operation planning method according to claim 13, further comprising:
generating, by either of the planning devices, a plurality of the combinations of operating devices;
determining, by either of the planning devices, assignments of the combinations used for each of the planning devices to generate the operation plan; and
notifying, by either of the planning devices, the assignments to the plurality of planning devices.

15. The operation planning method according to claim 12, further comprising:
generating, by either of the plurality of planning devices, a plurality of the combinations of operating devices;
storing, by either of the plurality of planning devices, first data which is data of the generated combinations to a storage space which is accessible from the other planning devices;
the plurality of planning devices each selecting the combination used for generating the operation plan by accessing the first data; and
the plurality of planning devices each marking the first data corresponding to the selected combination to ensure that selection of the combination is avoided by the other planning devices.

16. A planning device comprising:
a communication circuit configured to receive combination data which is data of combinations of operating devices generated by other planning devices among a plurality of operating devices, the combinations of operating devices being configured to output total outputs required in a plurality of planning periods;

processing circuitry configured to:
  generate a combination of operating devices configured to output total outputs required in a plurality of planning periods based on information of a plurality of operating devices and the combination data, the combination generated being different from the combinations of operating devices generated by the other planning devices;
  generate a start-stop pattern of the operating devices in the plurality of planning periods based on the combination generated; and
  determine output setting values of the operating devices which operate in each of the planning periods, according to the start-stop pattern to generate an operation plan, the operation plan including the combination and the output setting values of the operating devices which operate in each of the planning periods, wherein the planning device and the other planning device select an operation plan which is actually used for operation of the plurality of operating devices from a plurality of operation plans generated by the planning device and the other planning device.

17. The planning device according to claim 16, wherein the processing circuit is configured to generate the combination of operating devices by applying either genetic algorithms, reinforcement learning or particle swarm optimization to the combination data.

18. The planning device according to claim 16, wherein the communication circuit is configured to transmit data of the combination of the operating devices generated by the processing circuit to a plurality of planning devices.

19. The planning device according to claim 16, wherein the processing circuit is configured to: generate a plurality of the combinations; determine assignments of the combinations each of the planning devices uses to generate the operation plan; and notify the assignments to the plurality of planning devices.

20. The planning device according to claim 17, wherein the processing circuit is configured to: generate a plurality of the combinations; and
store first data which is data of the generated combinations to a storage space which is accessible from the other planning devices via the communication circuit, if an authority is granted,
the processing circuit is configured to: access the first data in the storage space via the communication circuit; select the combination used for generating the operation plan; mark the first data corresponding to the selected combination; and exclude the first data which is marked from selection of the combination used for generating the operation plan, if the authority is not granted.

* * * * *